United States Patent
Shiraiwa et al.

(10) Patent No.: US 12,473,861 B2
(45) Date of Patent: Nov. 18, 2025

(54) FUEL SUPPLY DEVICE FOR GAS TURBINE AND METHOD FOR CONTROLLING FUEL SUPPLY DEVICE FOR GAS TURBINE

(71) Applicant: MITSUBISHI HEAVY INDUSTRIES, LTD, Tokyo (JP)

(72) Inventors: Takashi Shiraiwa, Tokyo (JP); Takefumi Takahashi, Tokyo (JP); Rei Ikeda, Tokyo (JP); Shinichi Yamazaki, Tokyo (JP); Shinya Uchida, Tokyo (JP); Mitsuhiro Morishita, Tokyo (JP); Atsuhiko Kanebako, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/675,947

(22) Filed: May 28, 2024

(65) Prior Publication Data
US 2024/0410585 A1 Dec. 12, 2024

(30) Foreign Application Priority Data
Jun. 7, 2023 (JP) .................. 2023-094108

(51) Int. Cl.
*F02C 7/22* (2006.01)
*F02C 7/232* (2006.01)
(Continued)

(52) U.S. Cl.
CPC ............... *F02C 7/232* (2013.01); *F02C 7/22* (2013.01); *F02C 9/263* (2013.01); *F02C 9/40* (2013.01);
(Continued)

(58) Field of Classification Search
CPC .... F02C 7/22; F02C 7/232; F02C 9/40; F02C 3/22
See application file for complete search history.

(56) References Cited

U.S. PATENT DOCUMENTS

| | | | |
|---|---|---|---|
| 2009/0272096 A1* | 11/2009 | Lawson | F02C 7/222 |
| | | | 60/39.463 |
| 2010/0229524 A1* | 9/2010 | Bhatnagar | C10K 3/06 |
| | | | 60/39.463 |

(Continued)

FOREIGN PATENT DOCUMENTS

| | | |
|---|---|---|
| JP | 2018-200166 | 12/2018 |
| WO | 2022/149540 | 7/2022 |

*Primary Examiner* — Gerald L Sung
(74) *Attorney, Agent, or Firm* — Wenderoth, Lind & Ponack, L.L.P.

(57) ABSTRACT

The present application relates to a fuel supply device for a gas turbine, which can supply a first fuel and a second fuel having a high combustion speed to a combustor of the gas turbine. In the present device, a first fuel supply line and a second fuel supply line are merged at a merging portion and are connected to the combustor via a mixing line. The second fuel supply line is provided with a first shutoff valve serving as a controlled object when the combustion state is switched from a single fuel combustion state to a mixed fuel combustion state, and a flow meter provided upstream of the first shutoff valve. The flow meter can output a detection value of a flow rate of the second fuel in order to calculate a mixing ratio of the first fuel and the second fuel for monitoring an operating state of the gas turbine.

10 Claims, 23 Drawing Sheets

(51) Int. Cl.
  *F02C 9/26*    (2006.01)
  *F02C 9/40*    (2006.01)
(52) U.S. Cl.
  CPC ...... *F05D 2270/01* (2013.01); *F05D 2270/30* (2013.01)

(56) References Cited

U.S. PATENT DOCUMENTS

| | | | |
|---|---|---|---|
| 2011/0036092 A1* | 2/2011 | Lawson | F23K 5/002 |
| | | | 60/734 |
| 2011/0126545 A1* | 6/2011 | Loeven, II | F23R 3/36 |
| | | | 60/39.281 |
| 2011/0265488 A1* | 11/2011 | Lawson | F02C 7/232 |
| | | | 60/39.55 |
| 2011/0270502 A1* | 11/2011 | Demougeot | F02C 9/28 |
| | | | 701/100 |

* cited by examiner

FUEL SUPPLY DEVICE FOR GAS TURBINE AND METHOD FOR CONTROLLING FUEL SUPPLY DEVICE FOR GAS TURBINE

CROSS-REFERENCE TO RELATED APPLICATIONS

This application claims the benefit of priority to Japanese Patent Application Number 2023-094108 filed on Jun. 7, 2023. The entire contents of the above-identified application are hereby incorporated by reference.

TECHNICAL FIELD

The present disclosure relates to a fuel supply device for a gas turbine and a method for controlling a fuel supply device for a gas turbine.

RELATED ART

For example, a thermal power plant uses, as a turbine for driving a generator, a gas turbine that can be driven by combustion gas generated by combustion of fuel. In recent thermal power plants, as a means to reduce carbon dioxide ($CO_2$) emissions, which cause global warming, a hydrogen-mixed combustion type gas turbine capable of reducing the emission amount of carbon dioxide by co-combusting (mixed fuel combustion) a first fuel such as natural gas with a second fuel (hydrogen) having a relatively high combustion speed as a fuel to be combusted to generate a combustion gas has been developed (for example, WO 2022/149540).

A fuel supply device for a gas turbine allowing for mixed fuel combustion of a first fuel and a second fuel typically has a configuration in which a first fuel supply line for supplying the first fuel and a second fuel supply line for supplying the second fuel join and are connected to a combustor in which the fuel is combusted. Since this type of fuel supply device has no small amount of the second fuel having high combustibility in the second fuel supply gas line, the second fuel remaining in the second fuel supply gas line to the outside is desirably removed when the gas turbine is stopped. For example, JP 2018-200166 A discloses, instead of a gas turbine, a hydrogen combustion boiler capable of combusting hydrogen as fuel in which hydrogen remaining in a hydrogen supply line for supplying hydrogen can be purged by using an inert gas such as nitrogen, helium, or neon.

SUMMARY

In a fuel supply device for a gas turbine allowing for mixed fuel combustion of the first fuel and the second fuel, in order to remove the second fuel remaining in the second fuel supply line at the time of stop, an operation is performed in which the second fuel is substituted by an inert gas as described in WO 2022/149540. In this case, at the time of starting the gas turbine, a sequence is adopted in which the inert gas in the second fuel supply line is substituted by the first fuel from the first fuel supply line and then the supply of the second fuel is started to start the mixed fuel combustion operation of the gas turbine so that the inert gas substituted in the second fuel supply line is not supplied to the combustor.

Meanwhile, in a gas turbine allowing for mixed fuel combustion of the first fuel and the second fuel, monitoring of a mixed fuel combustion operating state of the gas turbine is performed by calculating a monitoring parameter such as a mixed fuel combustion rate using a flow rate of the second fuel measured by a flow meter disposed in the second fuel supply line. As the flow meter disposed in the second fuel supply line, typically, a Coriolis flow meter capable of calculating a flow rate based on the volume of the passing fuel is used. However, when the above-described sequence is adopted, since the second fuel supply line is substituted by the first fuel at the time of starting the gas turbine, the first fuel passes by the flow rate disposed in the second fuel supply line in no small amount. Since the density of the first fuel such as natural gas is higher than that of the second fuel such as hydrogen gas, when the first fuel passes through the flow meter which is a Coriolis flow meter, the error of the measurement value becomes large. As a result, when a monitoring parameter such as the mixed fuel combustion rate of the gas turbine is obtained based on such a flow rate measurement value, there is a possibility that the operating state of the gas turbine is erroneously recognized. For example, since the mixed fuel combustion rate, which is a kind of monitoring parameter, is used for the interlock control related to the stop of the supply of the second fuel, when the error becomes large, the interlock control is activated even though the operating state of the gas turbine is normal, which causes a problem in the operation of the gas turbine.

At least one embodiment of the present disclosure has been made in view of the above-described circumstances, and an object thereof is to provide a fuel supply device for a gas turbine allowing for a stable operation and a method for controlling the fuel supply device of the gas turbine by preventing erroneous recognition of a mixing ratio at the time of starting the gas turbine.

To solve the above problem, a fuel supply device for a gas turbine according to at least one embodiment of the present disclosure is a fuel supply device for a gas turbine, which can supply a first fuel and a second fuel having a higher combustion speed than the first fuel to a combustor of the gas turbine and includes:

a first fuel supply line for supplying the first fuel;
a second fuel supply line for supplying the second fuel;
a mixing line that connects a merging portion of the first fuel supply line and the second fuel supply line to the combustor;
a first shutoff valve provided in the second fuel supply line and serving as a controlled object when an operating state of the gas turbine is switched from a single fuel combustion state in which only the first fuel is supplied to the combustor to a mixed fuel combustion state in which a mixed fuel of the first fuel and the second fuel is supplied to the combustor; and
a flow meter provided upstream of the first shutoff valve in the second fuel supply line and capable of outputting a detection value of a flow rate of the second fuel in order to calculate a mixing ratio of the first fuel and the second fuel for monitoring an operating state of the gas turbine.

To solve the above problem, a method for controlling a fuel supply device for a gas turbine according to at least one embodiment of the present disclosure is a method for controlling a fuel supply device for a gas turbine, which can supply a first fuel and a second fuel having a higher combustion speed than the first fuel to a combustor of the gas turbine and including:

a first fuel supply line for supplying the first fuel;
a second fuel supply line for supplying the second fuel;

a mixing line that connects a merging portion of the first fuel supply line and the second fuel supply line to the combustor;

a first shutoff valve provided in the second fuel supply line and serving as a controlled object when an operating state of the gas turbine is switched from a single fuel combustion state in which only the first fuel is supplied to the combustor to a mixed fuel combustion state in which a mixed fuel of the first fuel and the second fuel is supplied to the combustor;

a flow meter provided upstream of the first shutoff valve in the second fuel supply line and capable of outputting a detection value of a flow rate of the second fuel in order to calculate a mixing ratio of the first fuel and the second fuel for monitoring an operating state of the gas turbine;

an isolation valve provided between the first shutoff valve and the merging portion in the second fuel supply line;

a vent line branched from between the first shutoff valve and the isolation valve in the second fuel supply line; and a vent valve provided in the vent line.

The method includes:

supplying a second fuel to an upstream side of the isolation valve in the second fuel supply line with the gas turbine stopped and the isolation valve closed;

supplying the first fuel to a downstream side of the first shutoff valve in the second fuel supply line by closing the first shutoff valve and opening the isolation valve; and opening the first shutoff valve when the first shutoff valve has an upstream pressure higher than a downstream pressure in the second fuel supply line with the gas turbine started.

A method for controlling a fuel supply device for a gas turbine according to at least one embodiment of the present disclosure is a method for controlling a fuel supply device for a gas turbine, which can supply a first fuel and a second fuel having a higher combustion speed than the first fuel to a combustor of the gas turbine and including:

a first fuel supply line for supplying the first fuel;

a second fuel supply line for supplying the second fuel;

a mixing line that connects a merging portion of the first fuel supply line and the second fuel supply line to the combustor;

a first shutoff valve provided in the second fuel supply line and serving as a controlled object when an operating state of the gas turbine is switched from a single fuel combustion state in which only the first fuel is supplied to the combustor to a mixed fuel combustion state in which a mixed fuel of the first fuel and the second fuel is supplied to the combustor;

a flow meter provided upstream of the first shutoff valve in the second fuel supply line and capable of outputting a detection value of a flow rate of the second fuel in order to calculate a mixing ratio of the first fuel and the second fuel for monitoring an operating state of the gas turbine;

a vent line branched from between the first shutoff valve and the flow meter in the second fuel supply line; and a vent valve provided in the vent line.

The method includes:

supplying a second fuel to an upstream side of the isolation valve in the second fuel supply line with the gas turbine stopped and the first shutoff valve closed;

supplying the first fuel to a downstream side of the first shutoff valve in the second fuel supply line; and opening the first shutoff valve when the first shutoff valve has an upstream pressure higher than a downstream pressure in the second fuel supply line with the gas turbine started.

At least one embodiment of the present disclosure can provide a fuel supply device for a gas turbine allowing for stable operation and a method for controlling a fuel supply device for a gas turbine by preventing erroneous recognition of a mixing ratio at the time of starting the gas turbine.

BRIEF DESCRIPTION OF DRAWINGS

The disclosure will be described with reference to the accompanying drawings, wherein like numbers reference like elements.

DESCRIPTION OF EMBODIMENTS

Figure 1:
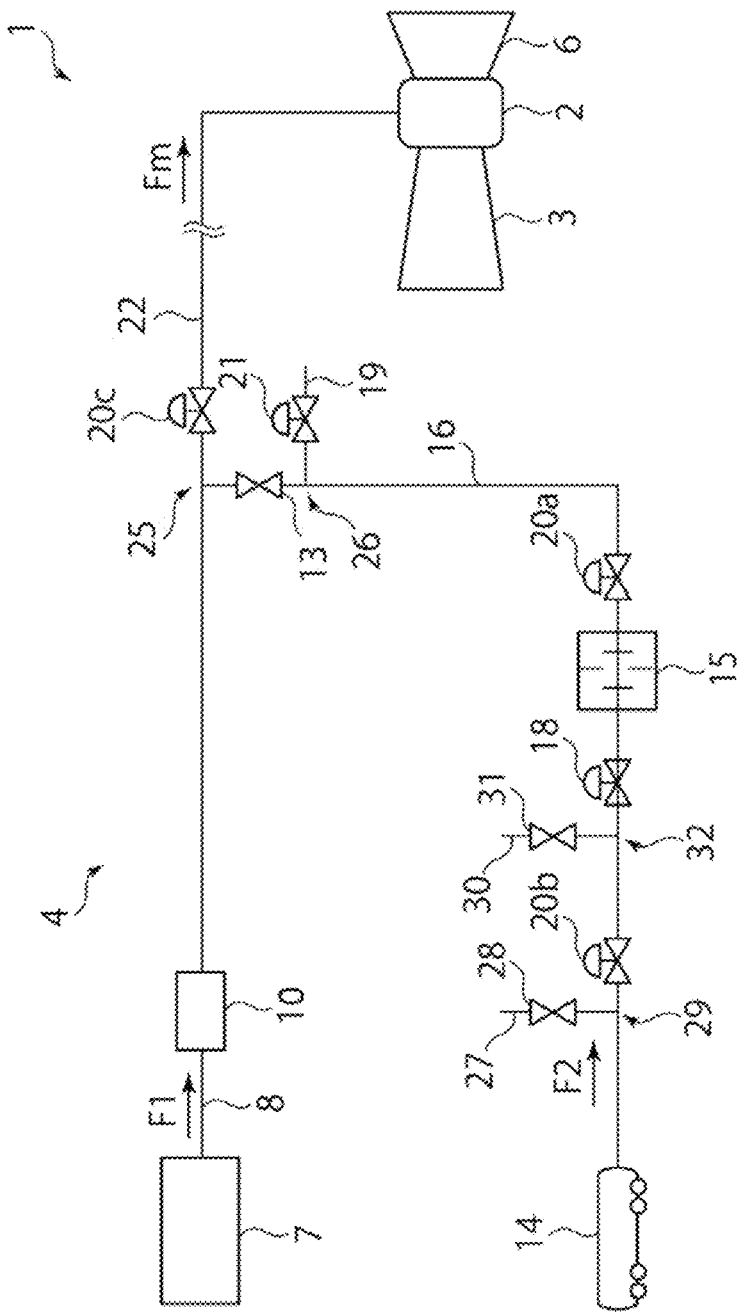
FIG. 1 is a schematic configuration diagram of a gas turbine according to a first embodiment.

Some embodiments of the disclosure will be described below with reference to the accompanying drawings. However, configurations described in the embodiments or illustrated in the drawings shall be interpreted as illustrative only and not intended to limit the scope of the disclosure thereto.

FIG. 1 is a schematic configuration diagram of a gas turbine 1 according to the first embodiment. The gas turbine 1 includes a compressor 3 for generating compressed air, a combustor 2 for generating combustion gas by performing mixed fuel combustion of the compressed air generated by the compressor 3 and the fuel, a fuel supply device 4 for supplying the fuel to the combustor 2, and a turbine 6 driven by the combustion gas. The compressor 3 and the turbine 6 are coupled to one shaft. In the gas turbine 1 having such a configuration, the compressed air compressed by the compressor 3 and the fuel supplied from the fuel supply device 4 are supplied to the combustor 2, mixed, and combusted, and thus the combustion gas is generated. The combustion gas flows into the turbine 6 and functions as power for driving the turbine 6.

The fuel supply device 4 handles the mixed fuel in which a first fuel F1 and a second fuel F2 are mixed as the fuel supplied to the combustor 2. The combustion speed of the second fuel F2 is higher than that of the first fuel F1. The second fuel F2 has a lower amount of heat per unit volume than the first fuel F1. In the present embodiment, the first fuel F1 is liquefied natural gas (LNG), and the second fuel F2 is hydrogenous gas.

The first fuel F1 can be supplied via a first fuel supply line 8 which is connected to a first fuel supply source 7. The first fuel supply line 8 is provided with a first flow meter 10 for detecting the flow rate of the first fuel F1. The first flow meter 10 may be an orifice flow meter like a second flow meter 15 described later or may be a Coriolis flow meter.

The second fuel F2 can be supplied via a second fuel supply line 16 connected to a second fuel supply source 14. The second fuel supply line 16 is provided with a second flow meter 15 which is an orifice flow meter for detecting the flow rate of the second fuel F2, a flow control valve 18 for controlling the flow rate of the second fuel F2, and first and second shutoff valves 20a and 20b. The second shutoff valve 20b is provided upstream of the first shutoff valve 20a in the second fuel supply line 16. The first and second shutoff valves 20a and 20b can stop the supply of the second fuel F2 to a merging portion 25 by being controlled to be closed.

An isolation valve 13 is provided between the first shutoff valve 20a and the merging portion 25 in the second fuel supply line 16. The isolation valve 13 is a manual valve that can be opened and closed manually by an operator. In particular, in the present embodiment, the isolation valve 13 is provided in the second fuel supply line 16 at a position closer to the merging portion 25 than to the first shutoff valve 20a. When the isolation valve 13 is in the open state, by the second fuel supply line 16 and the merging portion 25 communicating with each other, the second fuel F2 supplied from the second fuel supply line 16 is mixed with the first fuel F1 supplied from the first fuel supply line 8 to be supplied to the combustor 2 as a mixed fuel Fm, so that the gas turbine 1 can perform the mixed fuel combustion operation. On the other hand, when the isolation valve 13 is in the closed state, the second fuel supply line 16 is isolated from the merging portion 25, whereby the supply of the second fuel F2 from the second fuel supply line 16 is stopped.

The second fuel supply line 16 includes a first vent line 19 branched from a branch point 26 provided between the first shutoff valve 20a and the isolation valve 13. The first vent line 19 is configured to communicate with the outside from the branch point 26, and is provided with a first vent valve 21 which can be opened and closed. The second fuel supply line 16 also includes a second vent line 27 branched from a branch point 29 provided upstream of the second shutoff valve 20b. The second vent line 27 is configured to communicate with the outside from the branch point 29, and is provided with a second vent valve 28 which can be opened and closed. The second fuel supply line 16 also includes a third vent line 30 branched from a branch point 32 provided between the second shutoff valve 20b and the flow control valve 18. The third vent line 30 is configured to communicate with the outside from the branch point 32, and is provided with a third vent valve 31 which can be opened and closed.

The branch point 26 of the first vent line 19 from the second fuel supply line 16 is provided at a position closer to the merging portion 25 than to the first shutoff valve 20a.

The first fuel supply line 8 and the second fuel supply line 16 merge with each other on the downstream side and are connected to a mixing line 22. When both the first fuel F1 and the second fuel F2 are supplied, the first fuel F1 and the second fuel F2 are mixed by merging with each other at the merging portion 25 of the first fuel supply line 8 and the second fuel supply line 16, and are sent to the combustor 2 via the mixing line 22 as the mixed fuel Fm, thereby enabling the mixed fuel combustion operation of the gas turbine 1. When the supply of the second fuel F2 is stopped, the mixing line 22 supplies only the first fuel F1 to the combustor 2, so that the gas turbine 1 can perform the single fuel combustion operation.

The mixing line 22 is provided with a third shutoff valve 20c capable of shutting off the fuel flowing through the mixing line 22.

Although not illustrated in detail, the downstream side of the mixing line 22 is branched and connected to a plurality of fuel spray nozzles included in the combustor 2. These fuel spray nozzles are premixing type fuel spray nozzles capable of premixing the fuel supplied from the mixing line 22 and the combustion air supplied from the compressor 3 and spraying the premixed fuel into the combustion chamber of the combustor 2 to form a flame.

The flow control valve 18, the first shutoff valve 20a, the second shutoff valve 20b, the third shutoff valve 20c, the first vent valve 21, the second vent valve 28, and the third vent valve 31 are control valves that can be automatically opened and closed based on control signals from a control device which is a control unit (not illustrated). The control device is configured as an electronic arithmetic device such as a computer device capable of performing various types of control necessary for the operation of the gas turbine 1 by executing a control program installed in advance.

Figure 2:
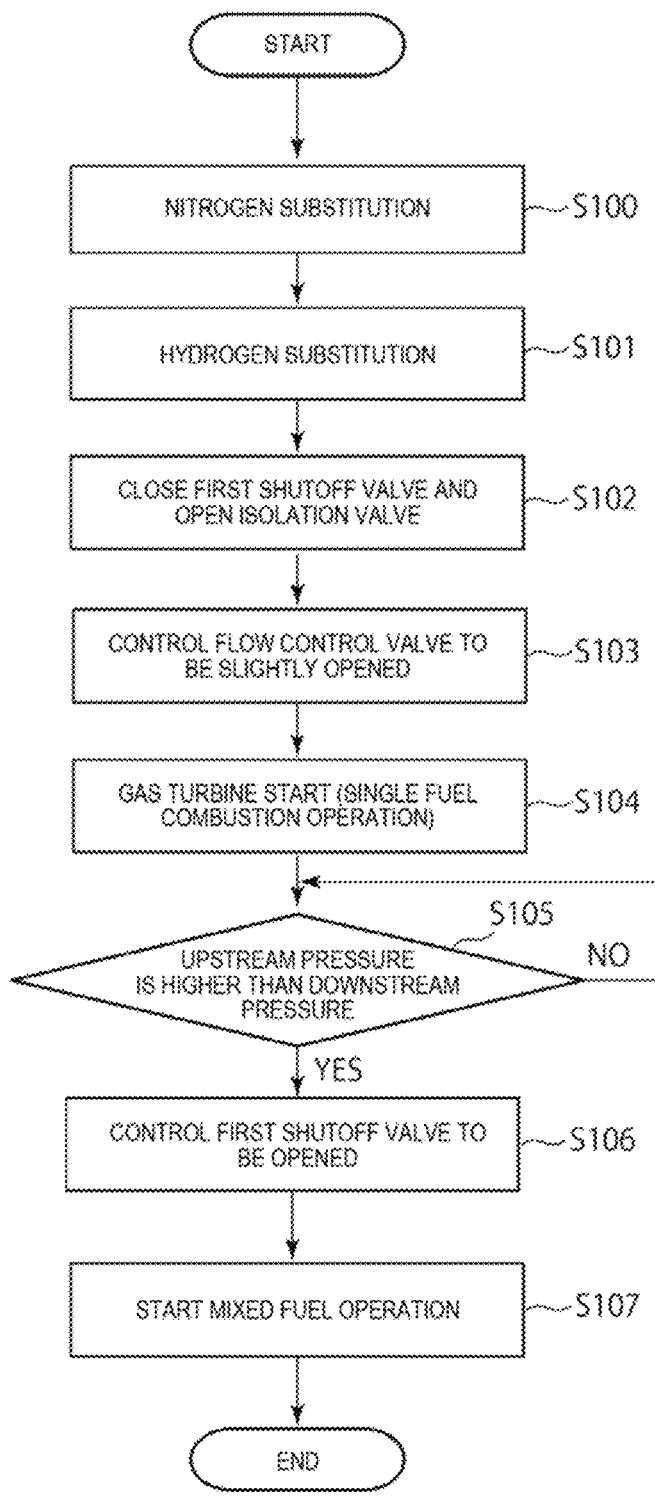
FIG. 2 is a flowchart illustrating a method for controlling a fuel supply device according to the first embodiment.

Next, a method for controlling the fuel supply device 4 having the above-mentioned configuration will be described. FIG. 2 is a flowchart illustrating a method for controlling the fuel supply device 4 according to the first embodiment, and FIGS. 3A to 3E are explanatory diagrams corresponding to respective steps in FIG. 2.

First, as an initial state in which the present control method is executed, as illustrated in 3A, the gas turbine 1 is in a stopped state, and the isolation valve 13, the third shutoff valve 20c, the first vent valve 21, the second vent valve 27, and the third vent valve 31 are in a closed state (the other valves are in an open state). From this initial state, nitrogen gas is supplied from the outside to the second fuel supply line 16 through the first vent line 19 while temporarily opening the first vent valve 21, whereby the upstream side of the isolation valve 13 in the second fuel supply line 16 is substituted by nitrogen gas (step S100). As a result, the highly combustible hydrogen gas remaining in the second fuel supply line 16 due to the previous operation is discharged to the outside, and the safety of the gas turbine 1 is ensured while the stopped state of the gas turbine 1 is continued.

The first vent valve 21 may be closed after the nitrogen gas substitution is completed in step S100. In step S100, the first fuel F1 flows from the first fuel supply line 8 into the second fuel supply line 16 on the downstream side of the isolation valve 13 (i.e., on the merging portion 25 side).

Figure 3A:
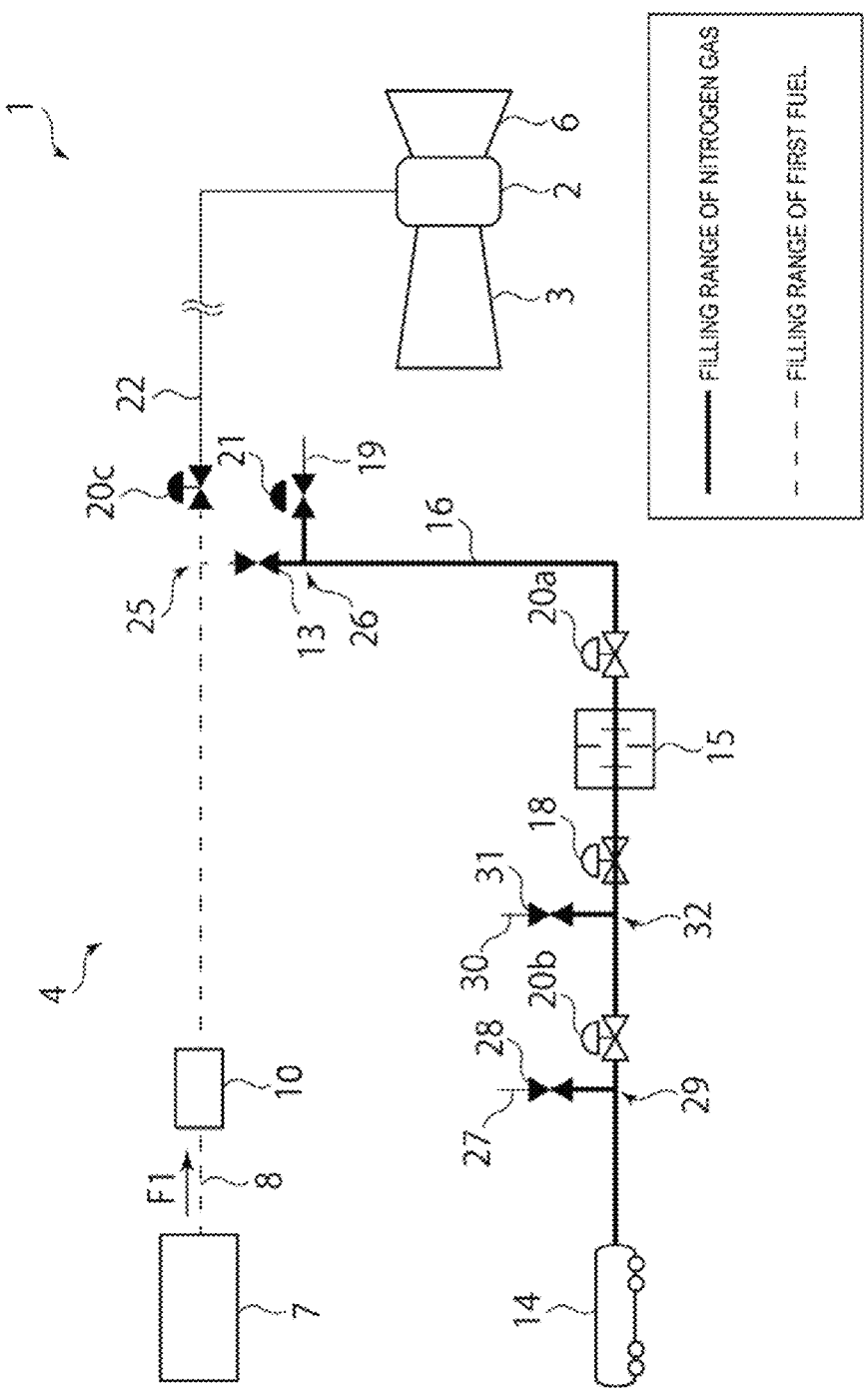
FIG. 3A is an explanatory diagram corresponding to each step in FIG. 2.
Figure 3B:
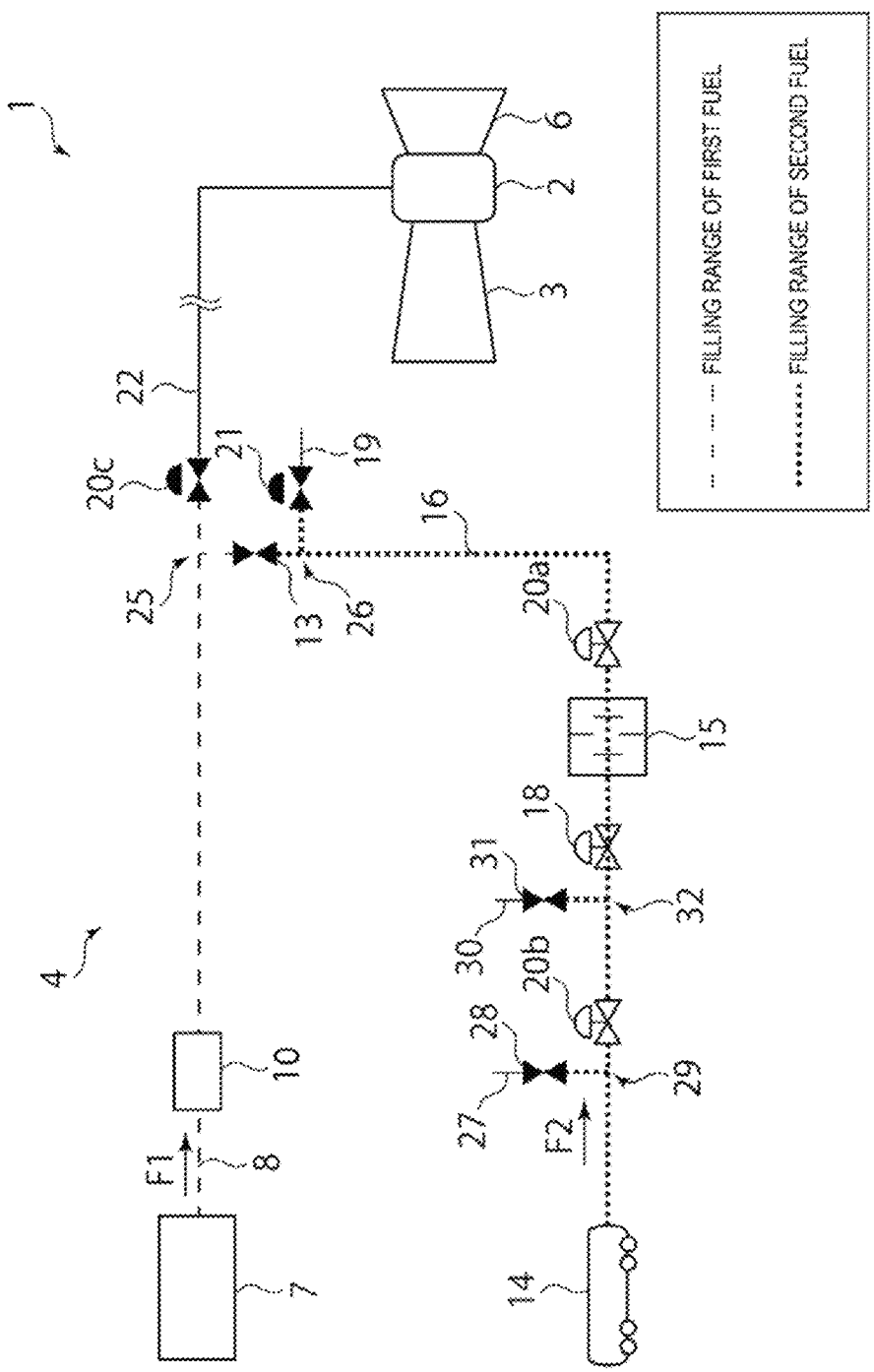
FIG. 3B is an explanatory diagram corresponding to each step in FIG. 2.

Subsequently, prior to the start of the gas turbine 1, as illustrated in FIG. 3B, the second fuel supply line 16 is supplied with hydrogen gas from the second fuel supply source 14 to substitute the upstream side of the isolation valve 13 in the second fuel supply line 16 by the hydrogen gas (step S101). At this time, the isolation valve 13 in the closed state is provided in the second fuel supply line 16 at a position closer to the merging portion 25 than to the first shutoff valve 20a. That is, the isolation valve 13 is disposed in the vicinity of the merging portion 25 in the second fuel supply line 16. This allows the gas turbine 1 before starting to be on standby by filling the second fuel F2 over a wide range of the second fuel supply line 16.

When the gas turbine 1 is tripped (urgently stopped) for some reason during the mixed fuel combustion operation of the gas turbine 1, the third shutoff valve 20c disposed in the mixing line 22 and the first shutoff valve 20a or the second shutoff valve 20b disposed in the second fuel supply line 16 are switched to the closed state, whereby the fuel supply to the combustor 2 is stopped. In this situation, if a valve which can be opened and closed is not disposed near the merging portion 25, the second fuel F2 remaining in the second fuel supply line 16 is directly supplied to the combustor 2 when the single fuel combustion operation is performed with the first fuel F1 at the time of next restart of the gas turbine. In the present embodiment, by disposing the isolation valve 13 near the merging portion 25 in the second fuel supply line 16, the second fuel F2 supplied to the combustor 2 when the gas turbine 1 is restarted can be suppressed to be small.

Figure 3C:
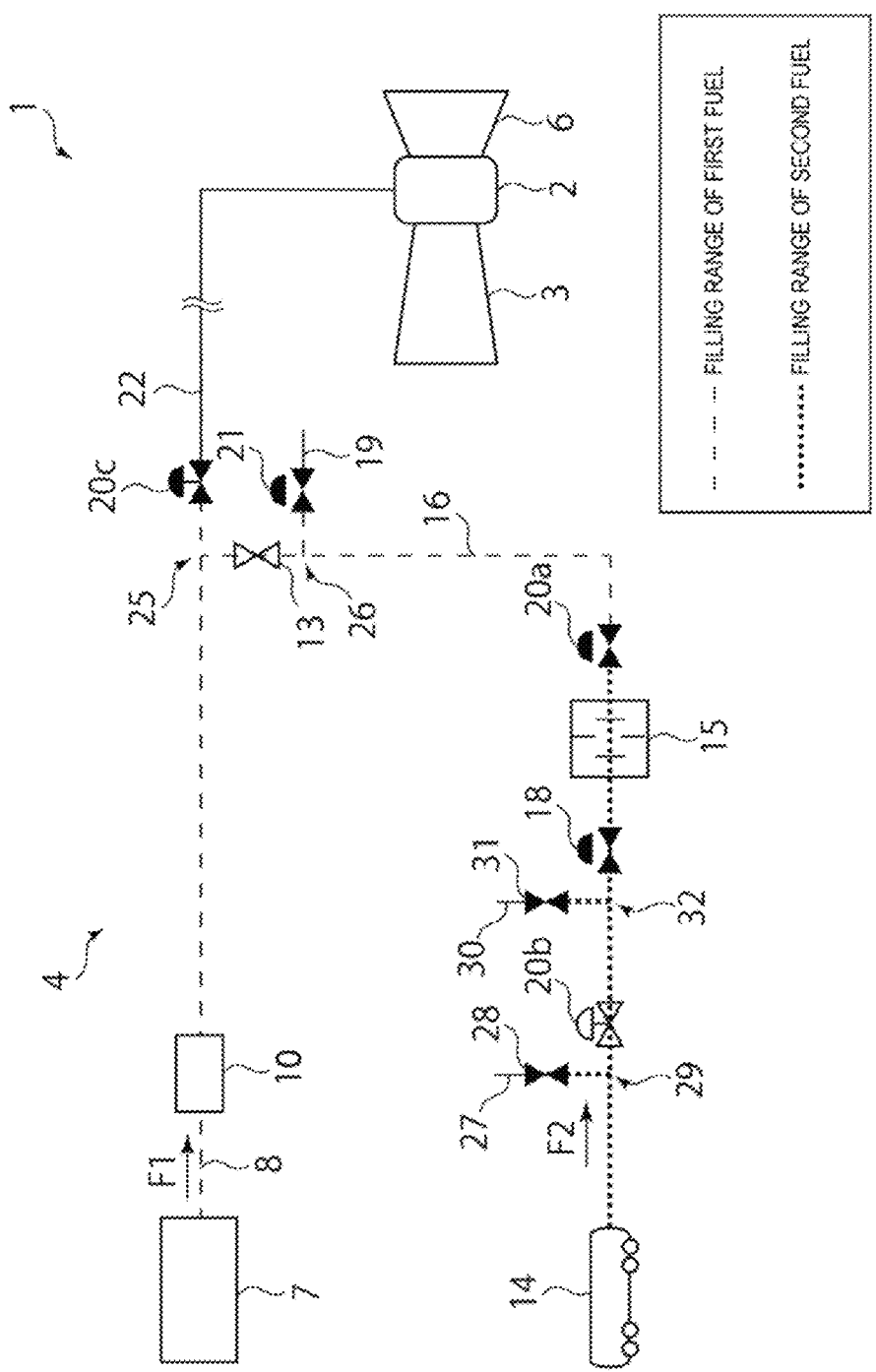
FIG. 3C is an explanatory diagram corresponding to each step in FIG. 2.
Figure 3D:
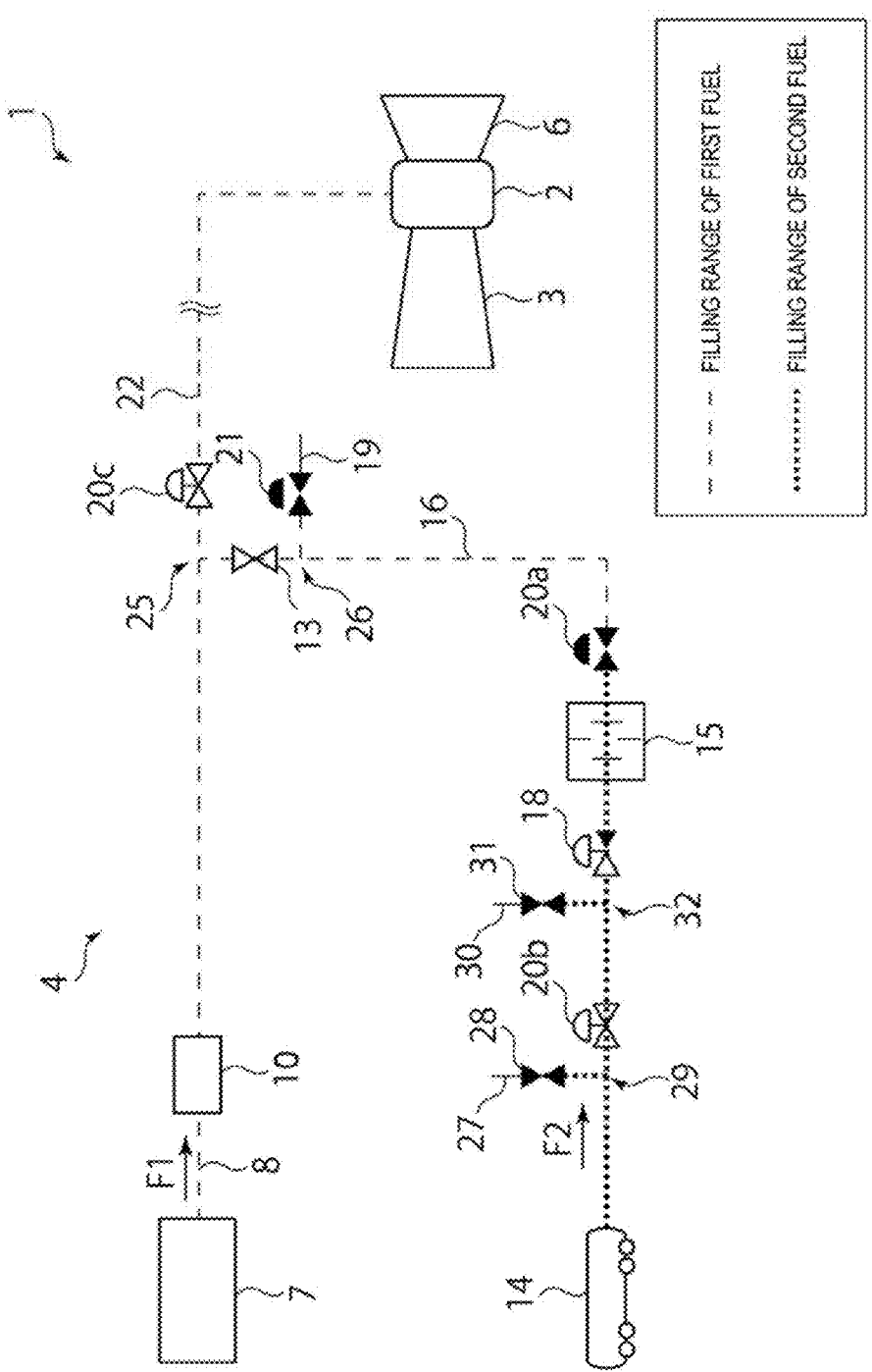
FIG. 3D is an explanatory diagram corresponding to each step in FIG. 2.

Subsequently, as illustrated in FIG. 3C, the first shutoff valve 20a is closed and the isolation valve 13 is opened to take in the first fuel F1 from the first fuel supply line 8 (step S102). At this time, since the first shutoff valve 20a is in the closed state, the first fuel F1 from the first fuel supply line 8 is filled in a range of the second fuel supply line 16 on the downstream side of the first shutoff valve 20a (i.e., on the merging portion 25 side).

In step S102, the flow adjustment valve 18 is controlled to be in the closed state as illustrated in 3C.

Subsequently, as illustrated in 3D, the flow adjustment valve 18 is controlled to be slightly opened to a predetermined degree of opening (step S103), and the third shutoff valve 20c is controlled to be opened, whereby the gas turbine 1 is started in the single fuel combustion state (step S104). As a result, the upstream pressure of the first shutoff valve 20a gradually increases.

Figure 3E:
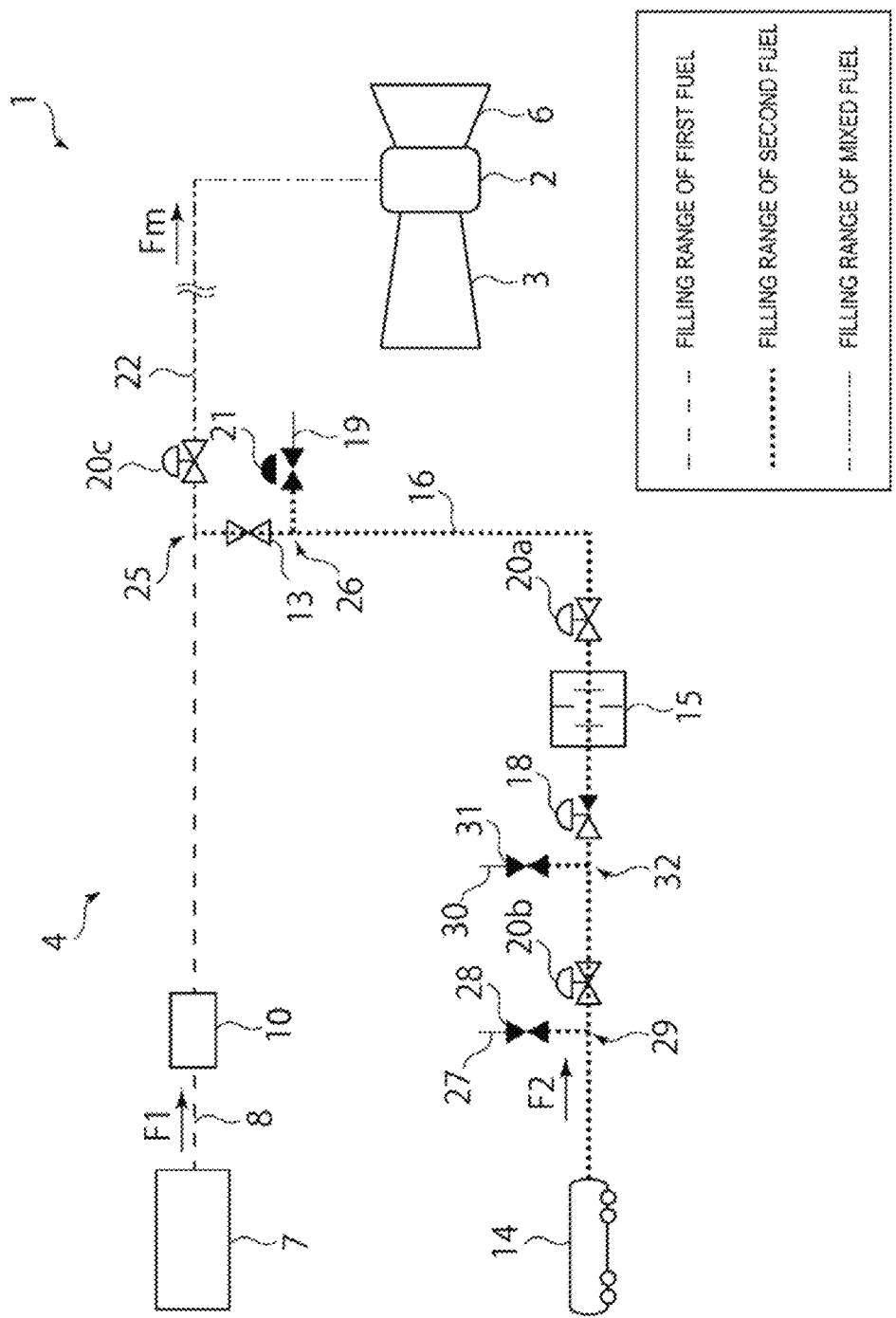
FIG. 3E is an explanatory diagram corresponding to each step in FIG. 2.

Subsequently, in the second fuel supply line 16, it is determined whether the first shutoff valve 20a has an upstream pressure P1 higher than a downstream pressure P2 (step S105). When the upstream pressure P1 is higher than the downstream pressure P2 (step S105: YES), the first shutoff valve 20a is controlled to be opened (step S106). As a result, as illustrated in FIG. 3E, the first fuel F1 on the upstream side of the first shutoff valve 20a is supplied to the merging portion 25 through the downstream side of the first shutoff valve 20a, whereby the mixed fuel combustion operation of the gas turbine 1 is started (step S107).

Figure 9:
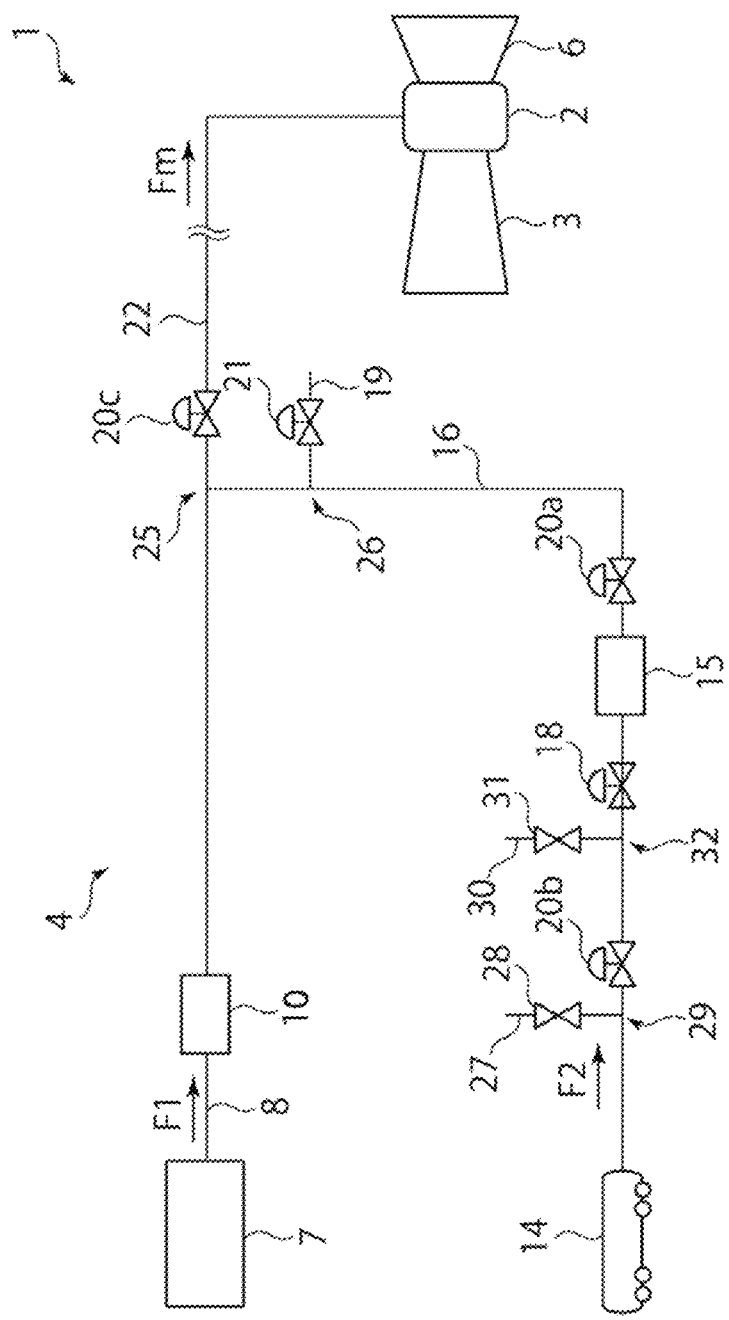
FIG. 9 is a schematic configuration diagram of a gas turbine according to reference technology.
Figure 10:
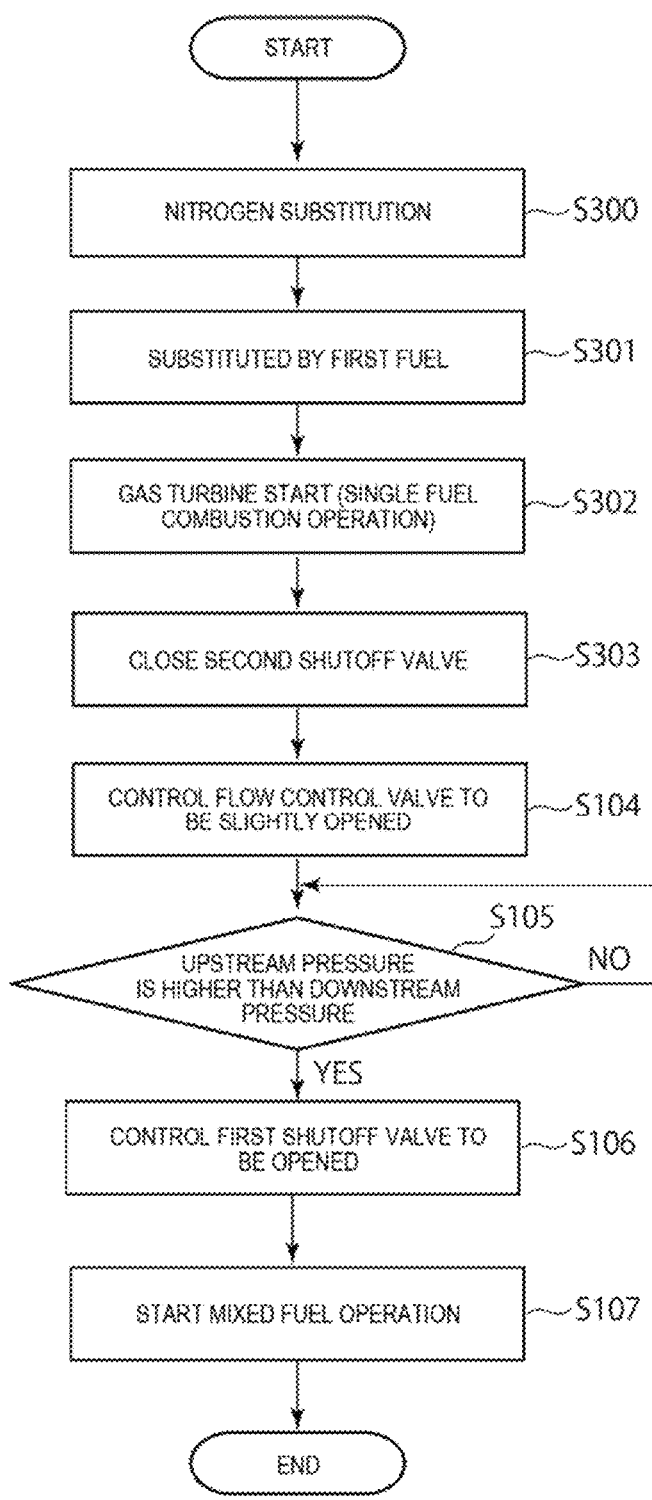
FIG. 10 is a flowchart illustrating a method for controlling the fuel supply device in FIG. 9.

Here, a configuration and control of a gas turbine 1' according to the reference technology will be described. FIG. 9 is a schematic configuration diagram of the gas turbine 1' according to the reference technology, FIG. 10 is a flowchart illustrating a method for controlling the fuel supply device 4 of FIG. 9, and FIGS. 11A to 11E are explanatory diagrams corresponding to respective steps of FIG. 10.

The configuration of the gas turbine 1 according to the reference technology is different from that of the fuel supply device 4 in the first embodiment illustrated in FIG. 1 in that the isolation valve 13 is not provided.

In the description that follows, common reference signs will be attached to configurations corresponding to the aforementioned first embodiment, with redundant description omitted as appropriate, unless otherwise noted.

First, as an initial state in which the present control method is executed, as illustrated in 11A, the gas turbine 1 is in a stopped state, and the third shutoff valve 20c, the first vent valve 21, the second vent valve 27, and the third vent valve 31 are in a closed state (the other valves are in an open state). From this initial state, nitrogen gas is supplied from the outside to the second fuel supply line 16 while temporarily opening the first vent valve 21, whereby the second fuel supply line 16 is substituted by nitrogen gas (step S300). As a result, the highly combustible hydrogen gas remaining in the second fuel supply line 16 due to the previous operation is discharged to the outside, and the safety of the gas turbine 1 is ensured while the stopped state of the gas turbine 1 is continued.

Figure 11A:
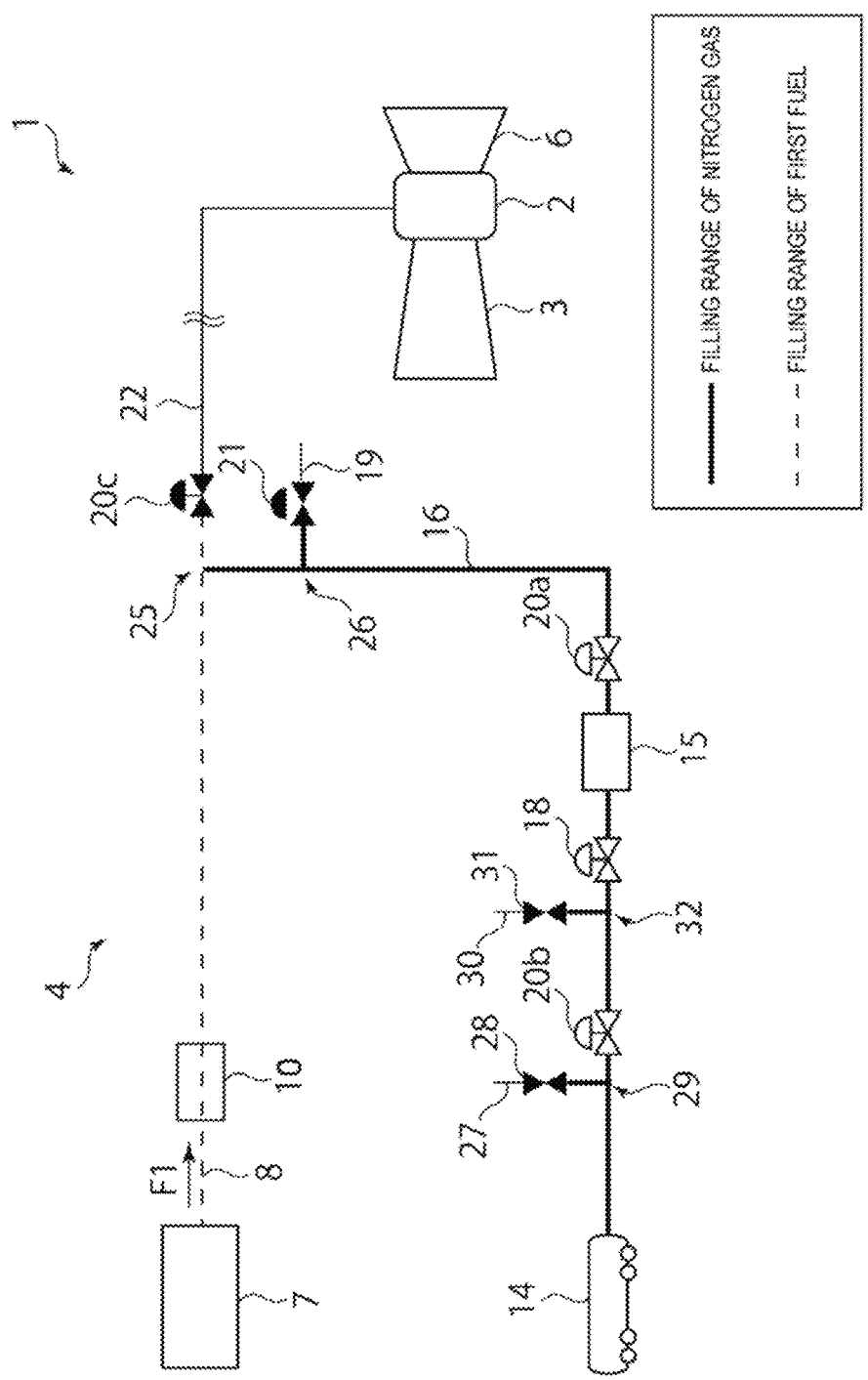
FIG. 11A is an explanatory diagram corresponding to each step in FIG. 10.
Figure 11B:
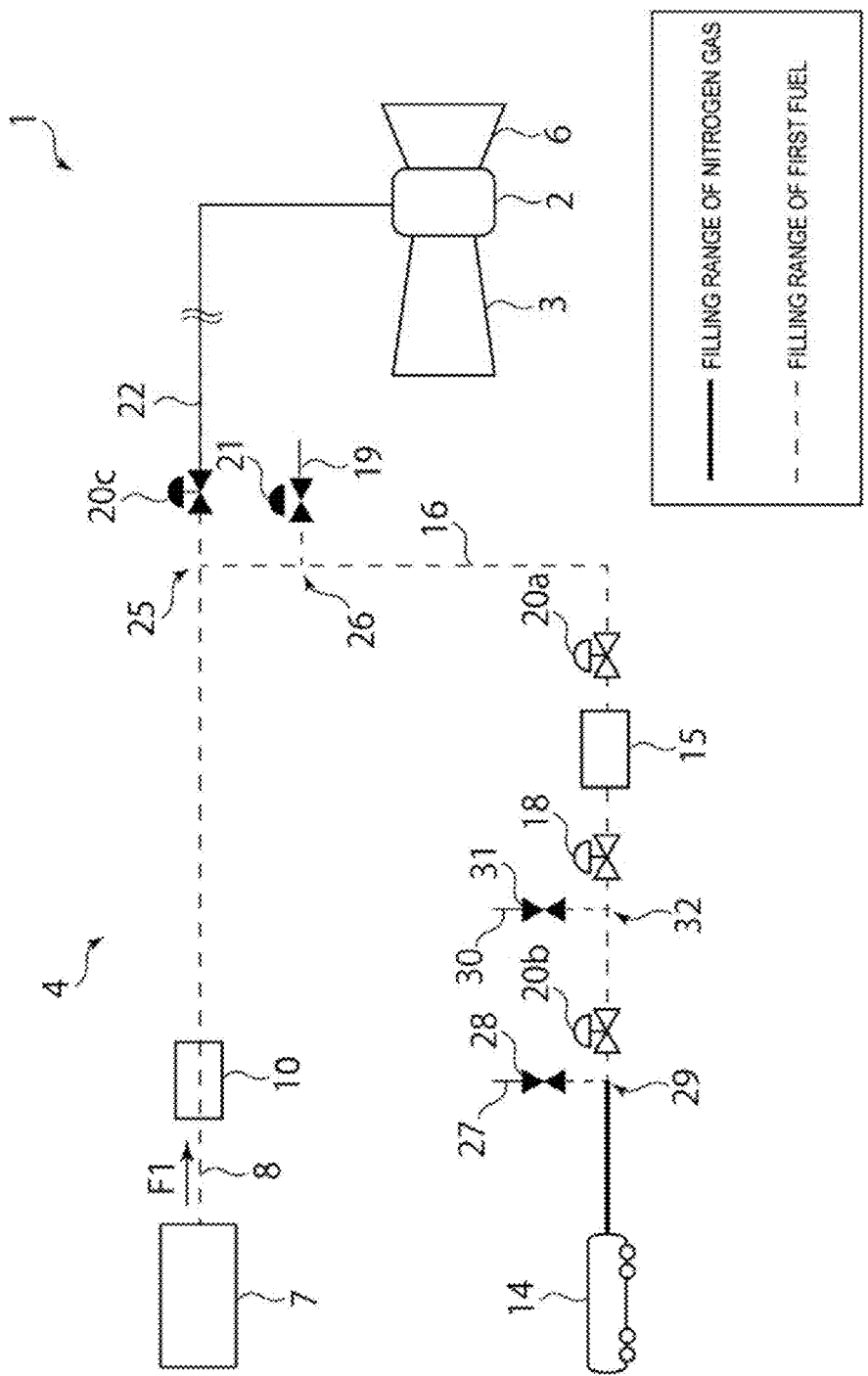
FIG. 11B is an explanatory diagram corresponding to each step in FIG. 10.

Subsequently, prior to the start of the gas turbine 1, the first fuel F1 is supplied to the second fuel supply line 16 from the first fuel supply line 8 through the merging portion 25 as illustrated in FIG. 11B, thereby substituting the second fuel supply line 16 by the first fuel F1 (step S301).

Figure 11C:
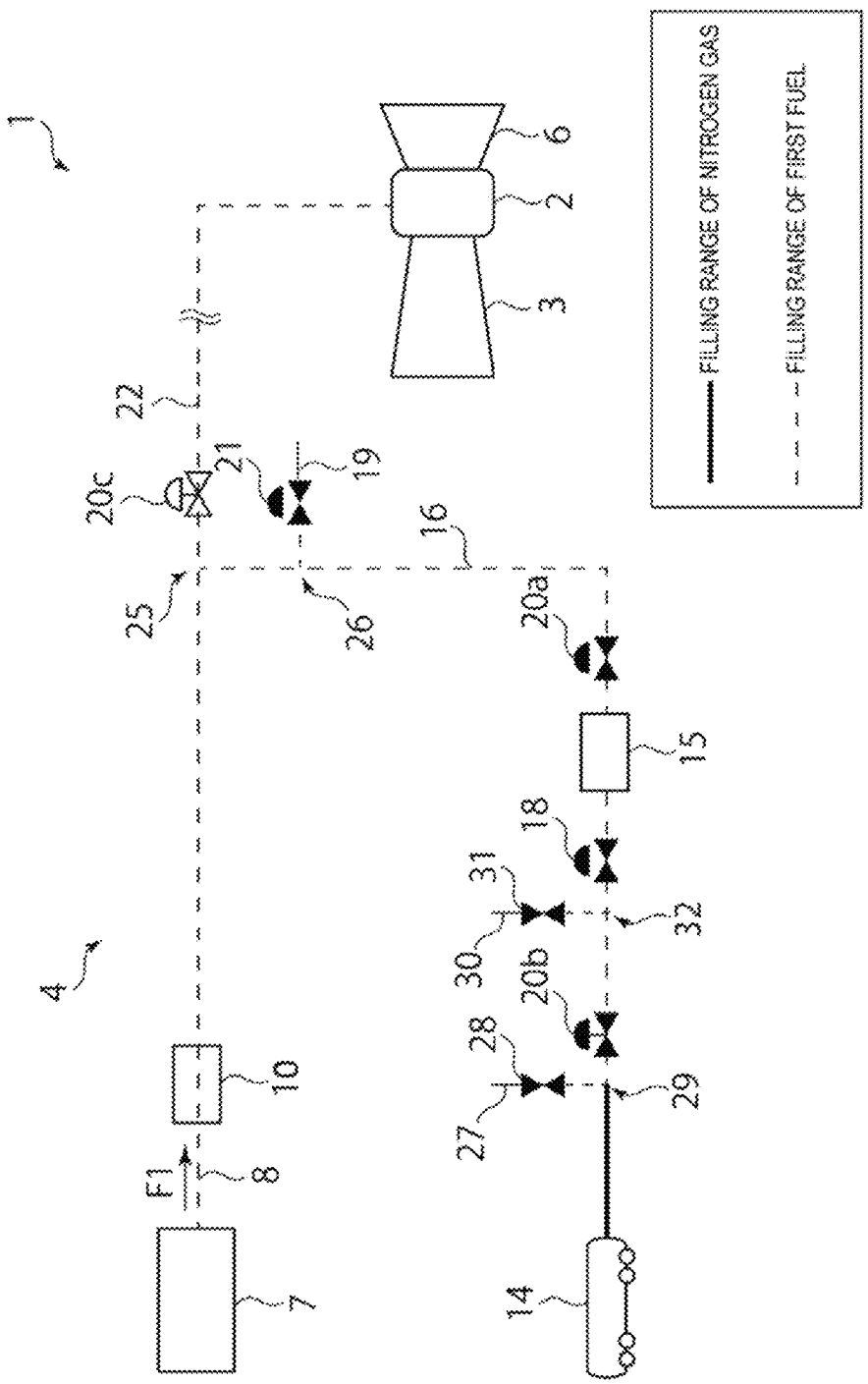
FIG. 11C is an explanatory diagram corresponding to each step in FIG. 10.
Figure 11D:
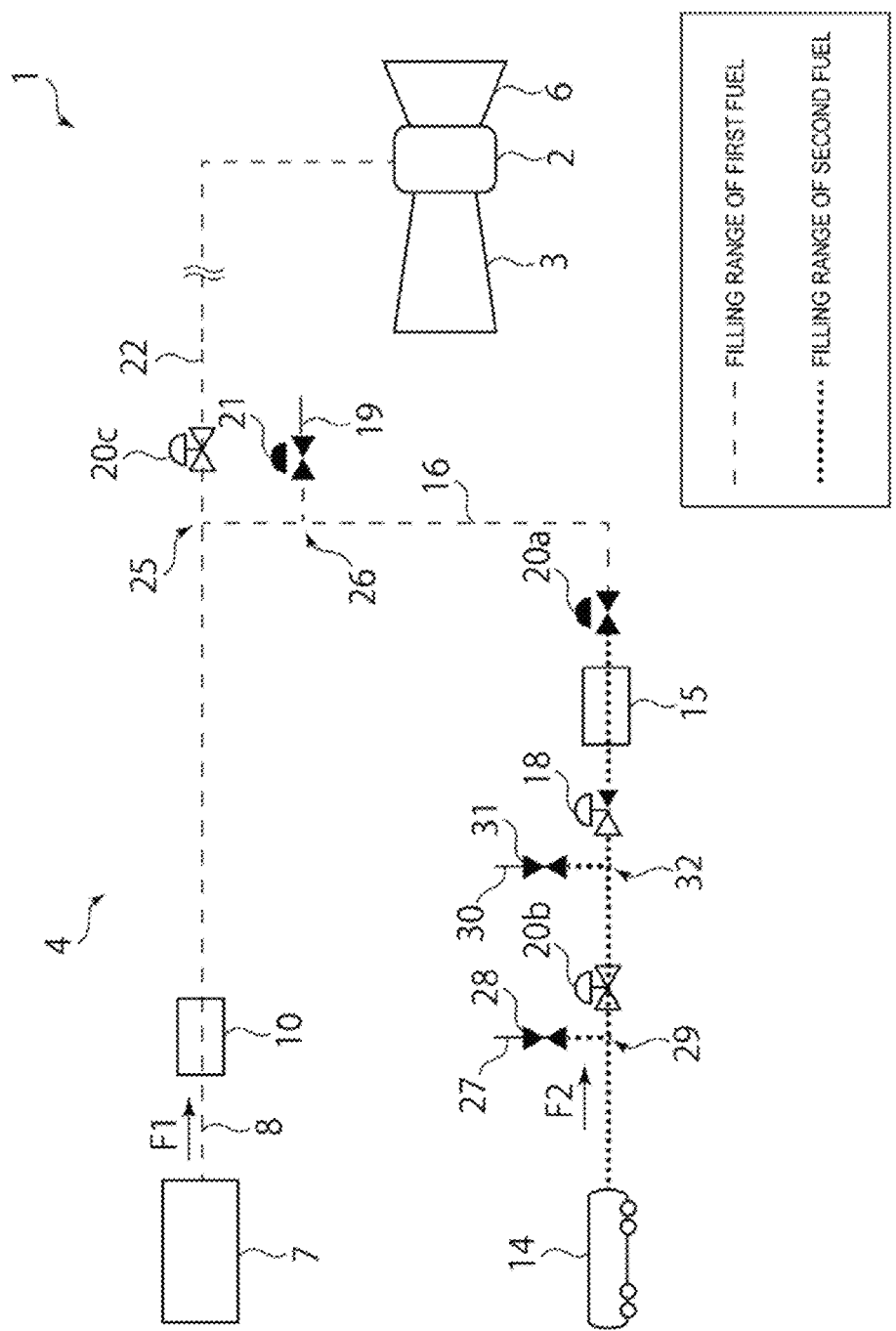
FIG. 11D is an explanatory diagram corresponding to each step in FIG. 10.

Subsequently, the third shutoff valve 20c is opened, the gas turbine 1 is started in the single fuel combustion state (step S302), and as illustrated in FIG. 11C, the first shutoff valve 20b is closed (step S303). Then, as illustrated in 11D, the flow control valve 18 is controlled to be slightly opened to a predetermined degree of opening (step S304). As a result, the upstream pressure of the first shutoff valve 20a gradually increases.

Figure 11E:
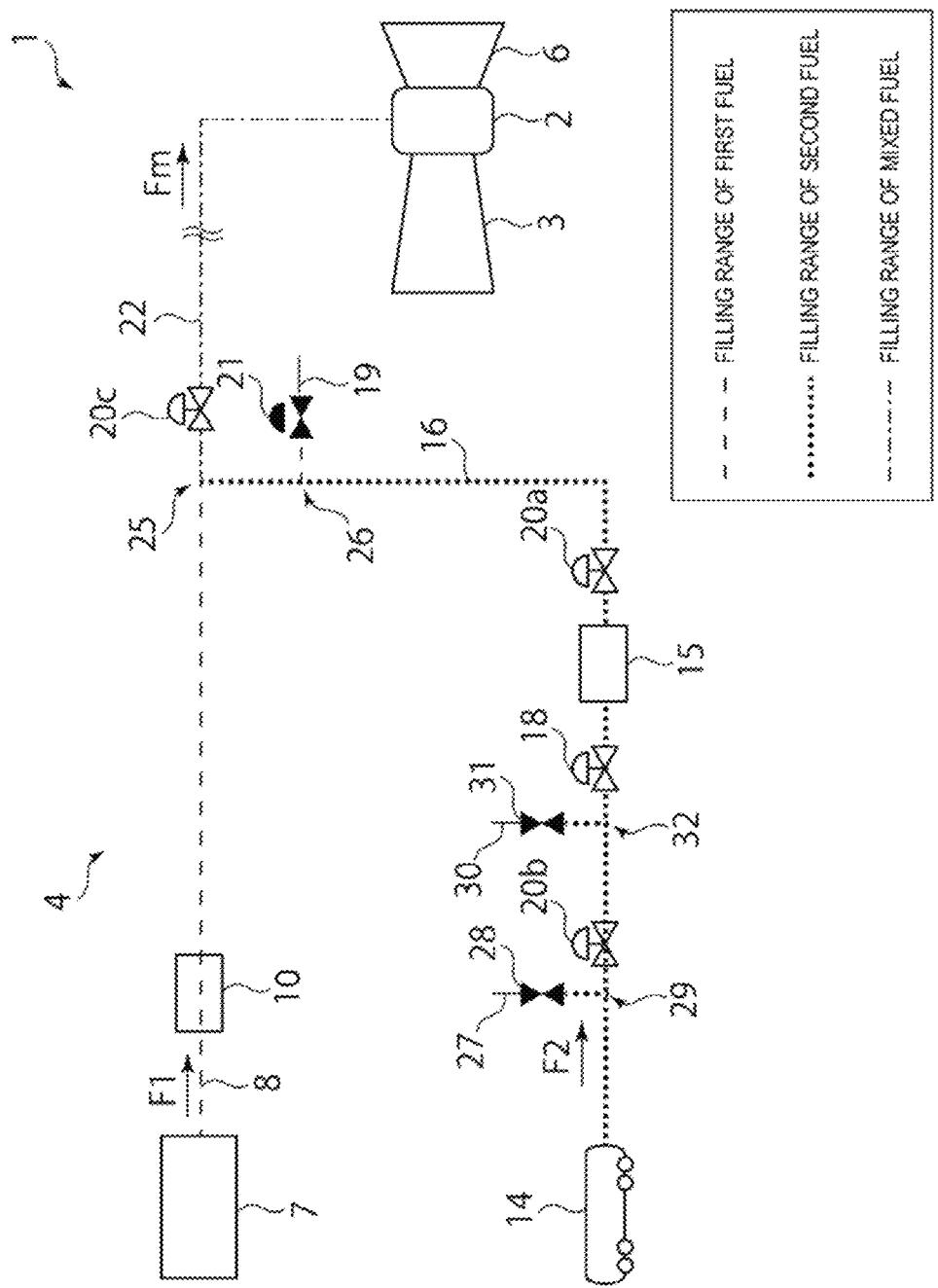
FIG. 11E is an explanatory diagram corresponding to each step in FIG. 10.

Subsequently, in the second fuel supply line 16, it is determined whether the first shutoff valve 20a has the upstream pressure P1 higher than the downstream pressure P2 (step S305). When the upstream pressure P1 is higher than the downstream pressure P2 (step S305: YES), the first shutoff valve 20a is controlled to be opened (step S306). As a result, as illustrated in FIG. 11E, the first fuel F1 on the upstream side of the first shutoff valve 20a is supplied to the merging portion 25 through the downstream side of the first shutoff valve 20a, whereby the mixed fuel combustion operation of the gas turbine 1 is started (step S307).

In such a series of control sequences in the reference technology, as illustrated in FIGS. 11B and 11C, the second flow meter 15 is included in the filling range of the first fuel F1 before the start of the gas turbine 1'. Therefore, when the gas turbine 1' is started, the first fuel F1 having a higher density than the second fuel F2 temporarily flows through the second flow meter 15. Therefore, when a Coriolis flow meter is used as the second flow meter 15, there is a possibility that the flow rate is erroneously recognized based on the density difference between the first fuel F1 and the second fuel F2. Since the flow rate detection value detected by the second flow meter 15 is used, for example, to calculate the mixing ratio which is a monitoring parameter during the mixed fuel combustion operation of the gas turbine 1', it is necessary to avoid such erroneous recognition.

Such a problem in the reference technology can be suitably solved by the first embodiment described above. In the series of control sequences in the first embodiment, the first fuel F1 does not reach the second flow meter 15. If the second flow meter 15 is a Coriolis flow meter and the first fuel F1 reaches the second flow meter 15 in the second fuel supply line 16, the first fuel F1 having a density different from that of the second fuel F2 flows through the second flow meter 15 when the gas turbine 1 is started, and thus the flow rate may be erroneously recognized. In particular, since the density of natural gas which is the first fuel F1 is greatly different from that of hydrogen gas which is the second fuel F2, the flow rate cannot be accurately measured if a Coriolis flow meter is used as the second flow meter 15. Since the measurement value of the second flow meter 15 is used for, for example, calculation of a mixed fuel combustion rate which is an important control parameter during the mixed fuel combustion operation of the gas turbine 1, such erroneous recognition must be avoided. On the other hand, in the present embodiment, since the first fuel F1 does not reach the second flow meter 15 as described above, such erroneous recognition by the second flow meter 15 can suitably avoided.

Figure 4:
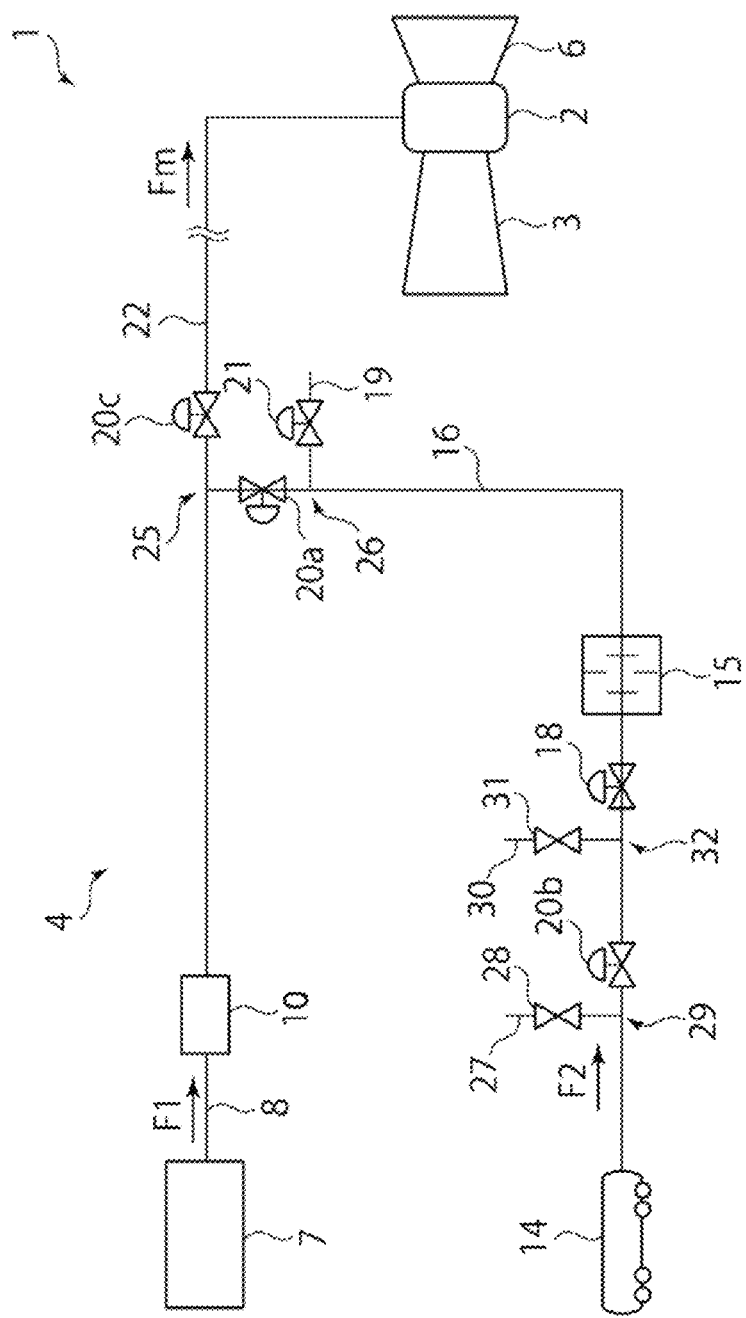
FIG. 4 is a schematic configuration diagram of a gas turbine according to a second embodiment.

FIG. 4 is a schematic configuration diagram of a gas turbine 1 according to a second embodiment. In the second embodiment, a fuel supply device 4 is different from the fuel supply device 4 according to the first embodiment illustrated in FIG. 1 in that the fuel supply device 4 does not include the isolation valve 13 but includes the first shutoff valve 20a at the position of the isolation valve 13.

In the description that follows, common reference signs will be attached to configurations corresponding to the aforementioned first embodiment, with redundant description omitted as appropriate, unless otherwise noted.

Figure 5:
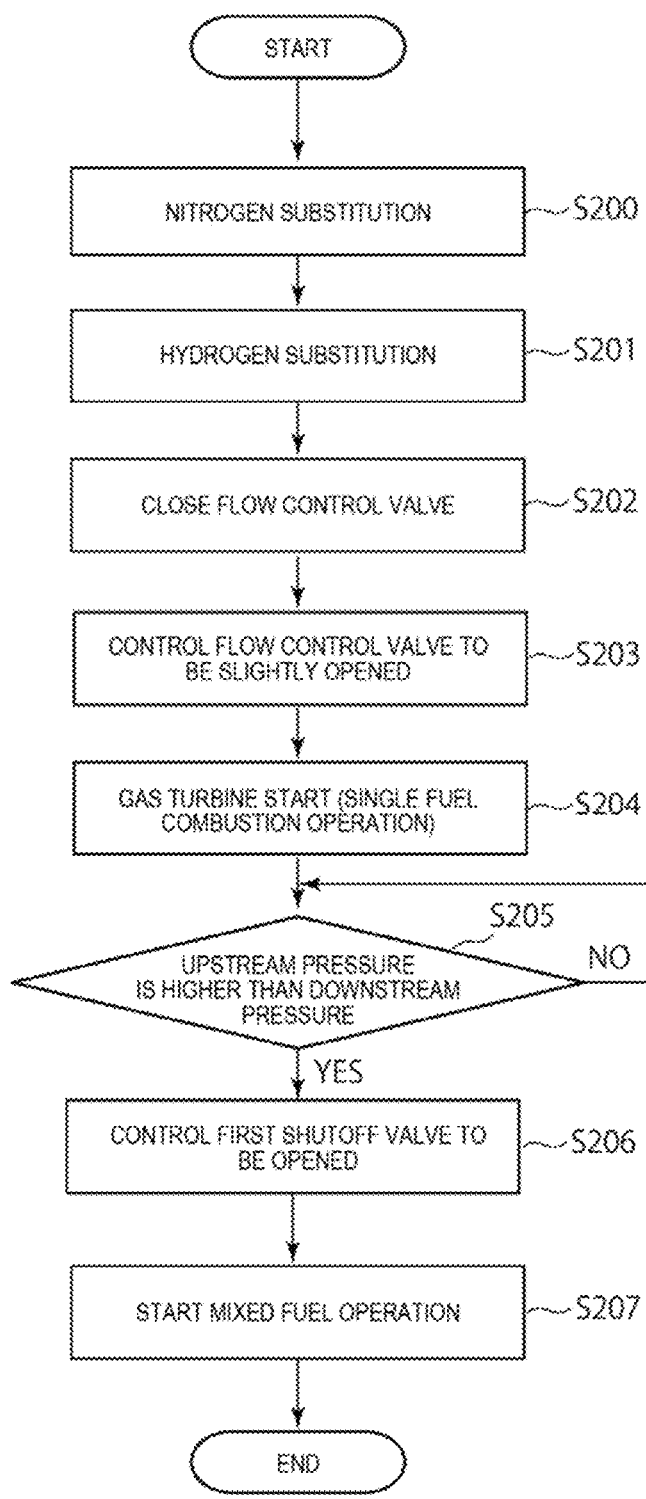
FIG. 5 is a flowchart illustrating a method for controlling a fuel supply device according to the second embodiment.

Next, a method for controlling the fuel supply device 4 having the configuration in FIG. 4 will be described. FIG. 5 is a flowchart illustrating a method for controlling the fuel supply device 4 according to the second embodiment, and FIGS. 6A to 6E are explanatory diagrams corresponding to respective steps in FIG. 5.

First, as an initial state in which the present control method is executed, as illustrated in 6A, the gas turbine 1 is in a stopped state, and the first shutoff valve 20a, the first vent valve 21, the second vent valve 27, and the third vent valve 31 are in a closed state (the other valves are in an open state). From this initial state, nitrogen gas is supplied from the outside to the second fuel supply line 16 through the first vent line 19 while temporarily opening the first vent valve 21, whereby the upstream side of the first shutoff valve 20a in the second fuel supply line 16 is substituted by nitrogen gas (step S200). As a result, the highly combustible hydrogen gas remaining in the second fuel supply line 16 due to the previous operation is discharged to the outside, and the safety of the gas turbine 1 is ensured while the stopped state of the gas turbine 1 is continued.

The first vent valve 21 may be closed after the nitrogen gas substitution is completed in step S200. In step S200, the first fuel F1 flows from the first fuel supply line 8 into the second fuel supply line 16 on the downstream side of the first shutoff valve 20a (i.e., on the merging portion 25 side).

Figure 6A:
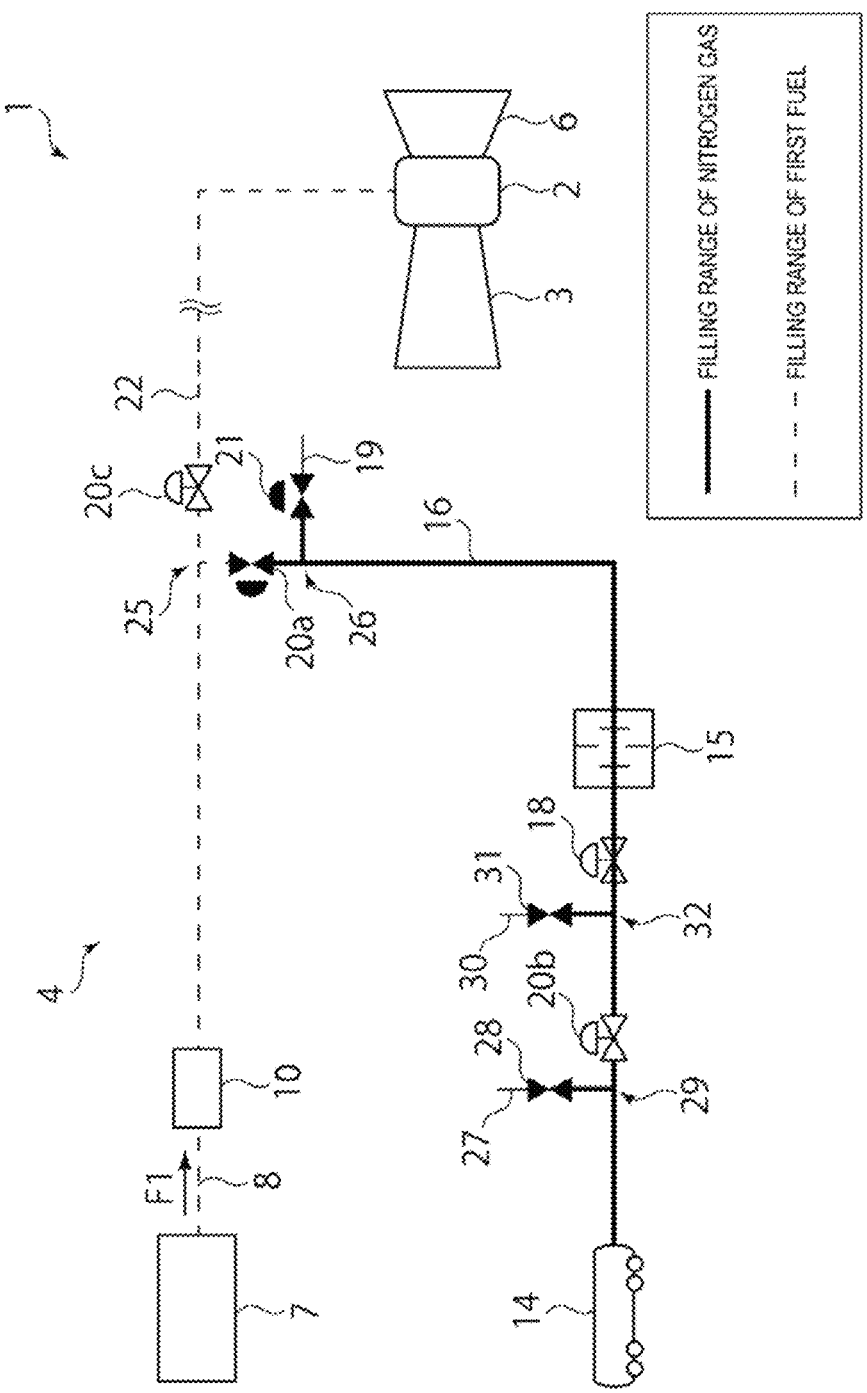
FIG. 6A is an explanatory diagram corresponding to each step in FIG. 5.
Figure 6B:
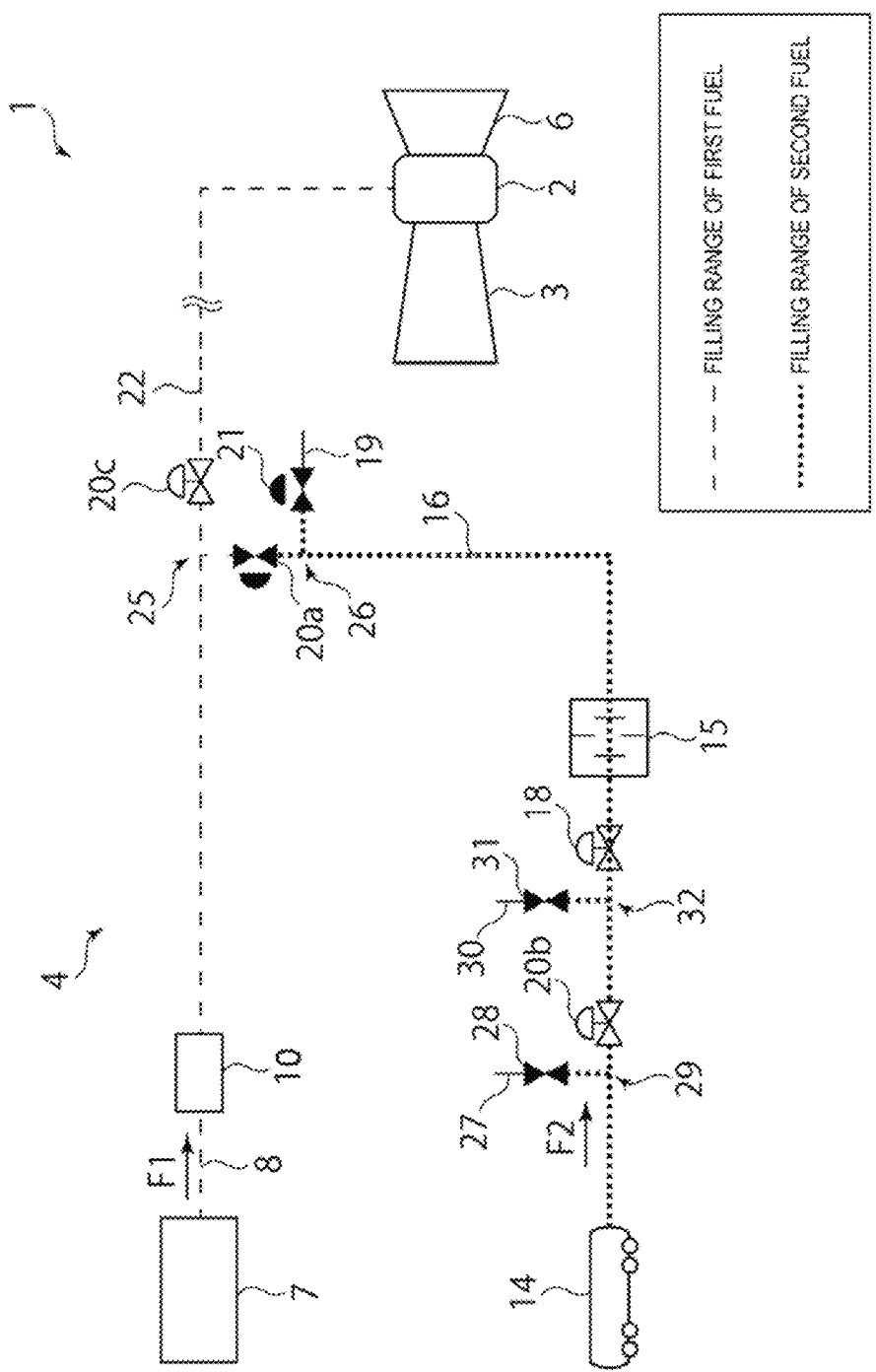
FIG. 6B is an explanatory diagram corresponding to each step in FIG. 5.

Subsequently, prior to the start of the gas turbine 1, as illustrated in FIG. 6B, the second fuel supply line 16 is supplied with hydrogen gas from the second fuel supply source 14 through the first vent line 19, whereby the upstream side of the second shutoff valve 20a in the second fuel supply line 16 is substituted by the hydrogen gas (step S201). At this time, the first shutoff valve 20a in the closed state is provided in the second fuel supply line 16 at a position closer to the merging portion 25 than to the second flow meter 15. That is, the first shutoff valve 20a is disposed in the vicinity of the merging portion 25 in the second fuel supply line 16. This allows the gas turbine 1 before starting to be on standby by filling the second fuel F2 over a wide range of the second fuel supply line 16.

Figure 6C:
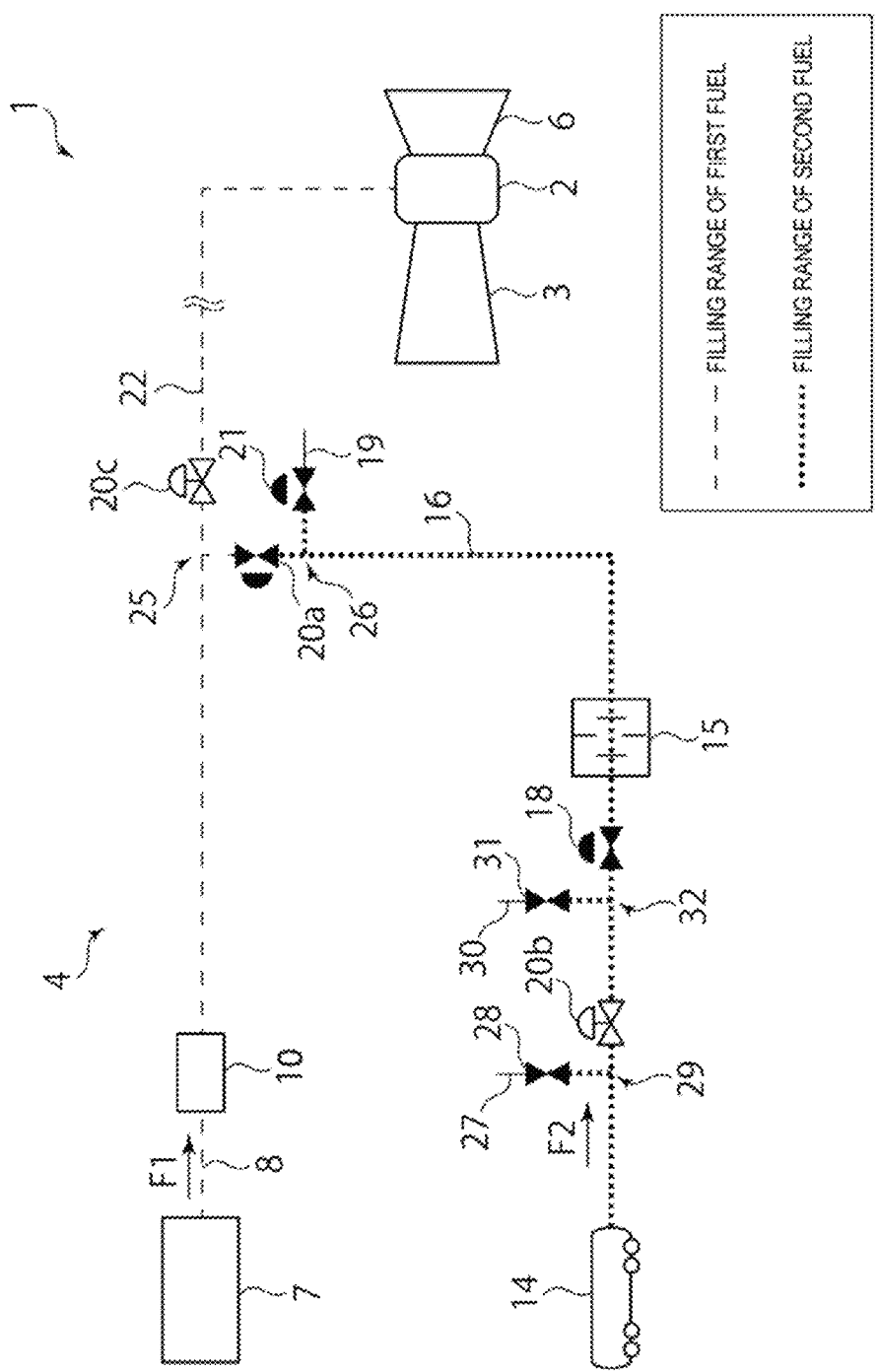
FIG. 6C is an explanatory diagram corresponding to each step in FIG. 5.
Figure 6D:
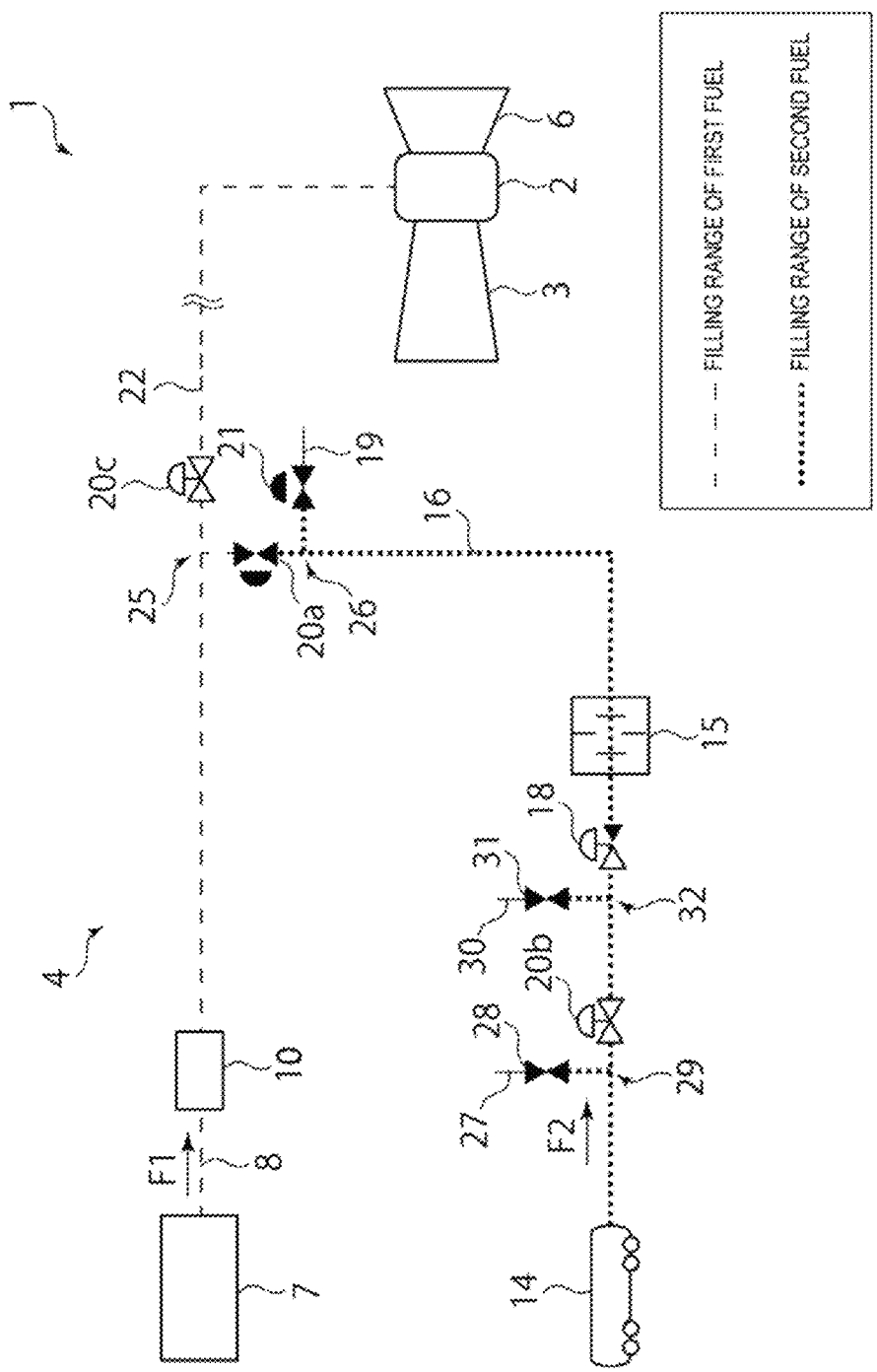
FIG. 6D is an explanatory diagram corresponding to each step in FIG. 5.

Subsequently, as illustrated in FIG. 6C, the flow adjustment valve 18 is controlled to be in the closed state (step S202). Then, as illustrated in 6D, the flow adjustment valve 18 is controlled to be slightly opened to a predetermined degree of opening (step S203), and the gas turbine 1 is started in the single fuel combustion state (step S204). This gradually increases the upstream pressure of the first shutoff valve 20a.

Figure 6E:
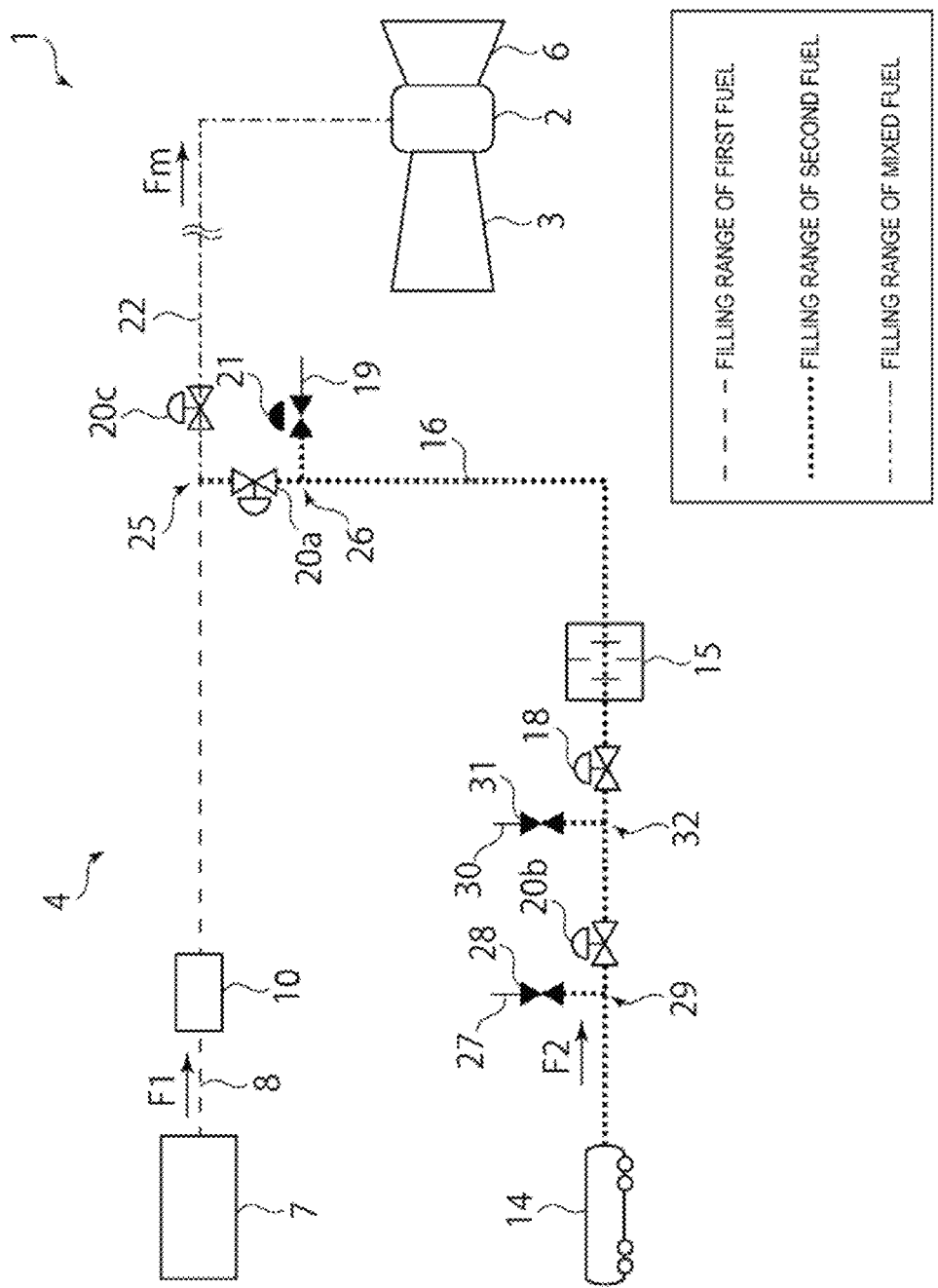
FIG. 6E is an explanatory diagram corresponding to each step in FIG. 5.

Subsequently, in the second fuel supply line 16, it is determined whether the first shutoff valve 20a has the upstream pressure P1 higher than the downstream pressure P2 (step S205). When the upstream pressure P1 is larger than the downstream pressure P2 (step S205: YES), the first shutoff valve 20a is controlled to be opened (step S206). As a result, as illustrated in FIG. 6E, the first fuel F1 on the upstream side of the first shutoff valve 20a is supplied to the merging portion 25 through the downstream side of the first shutoff valve 20a, whereby the mixed fuel combustion operation of the gas turbine 1 is started (step S207).

The second embodiment described above, which does not include the isolation valve 13 unlike the first embodiment, allows the fuel supply device 4 to be implemented with a simpler configuration. Even in a series of control sequences in the second embodiment having such a configuration, the first fuel F1 does not reach the second flow meter 15. If the second flow meter 15 is a Coriolis flow meter and the first fuel F1 reaches the second flow meter 15 in the second fuel supply line 16, the first fuel F1 having a density different from that of the second fuel F2 flows through the second flow meter 15 when the gas turbine 1 is started, and thus the flow rate may be erroneously recognized. In particular, since the density of natural gas which is the first fuel F1 is greatly different from that of hydrogen gas which is the second fuel F2, the flow rate cannot be accurately measured if a Coriolis flow meter is used as the second flow meter 15. Since the measurement value of the second flow meter 15 is used for, for example, calculation of a mixed fuel combustion rate which is an important control parameter during the mixed fuel combustion operation of the gas turbine 1, such erroneous recognition must be avoided. On the other hand, in the present embodiment, since the first fuel F1 does not reach the second flow meter 15 as described above, such erroneous recognition by the second flow meter 15 can suitably avoided.

In the gas turbine 1 having the above-described configuration, when the single fuel combustion operation with the first fuel F1 is switched to the mixed fuel combustion operation with the first fuel F1 and the second fuel F2, during the single fuel combustion operation with the first fuel F1, the second and third vent valves 28 and 31 provided between the first and second shutoff valves 20a and 20b are opened with the first and second shutoff valves 20a and 20b closed, whereby the flow control valve 18 is opened to a specified degree of opening for pressure equalization. At this time, if the distance between the first shutoff valve 20a and the second shutoff valve 20b is large, a relatively large volume of the second fuel F2 existing therebetween is discharged to the outside from the second vent valve 28 and the third vent valve 31 when the single fuel combustion of the first fuel F1 is performed, resulting in a large amount of waste. In the first embodiment, the distance between the first shutoff valve 20a and the second shutoff valve 20b being shorter than that in the second embodiment allows for reduced amount of the second fuel F2 discharged from the second vent valve 28 and the third vent valve 31 to the outside and efficient operation.

Figure 7:
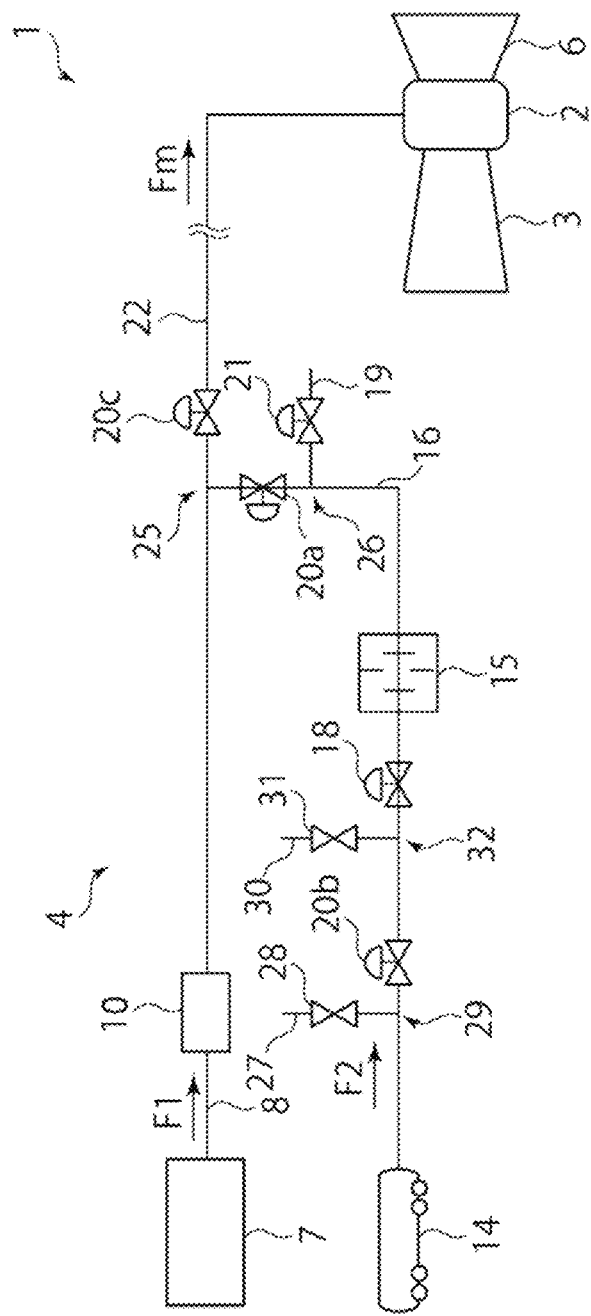
FIG. 7 is a modification example of FIG. 4.

FIG. 7 is a modification example of FIG. 4. In this modification example, a portion of the second fuel supply line 16 between the second flow meter 15 and the branch point 26 is shorter than that in the configuration illustrated in FIG. 4. Therefore, by reducing the volumes of the first fuel F1 and the second fuel F2 passing through the second fuel supply line 16 in a series of sequences, more efficient operation can be expected, and the device configuration can be made compact. In the present modification example, the distance between the first shutoff valve 20a and the second shutoff valve 20b being shorter than that in the second embodiment allows for the reduced amount of the second fuel F2 discharged from the second vent valve 28 and the third vent valve 31 to the outside and efficient operation.

Figure 8:
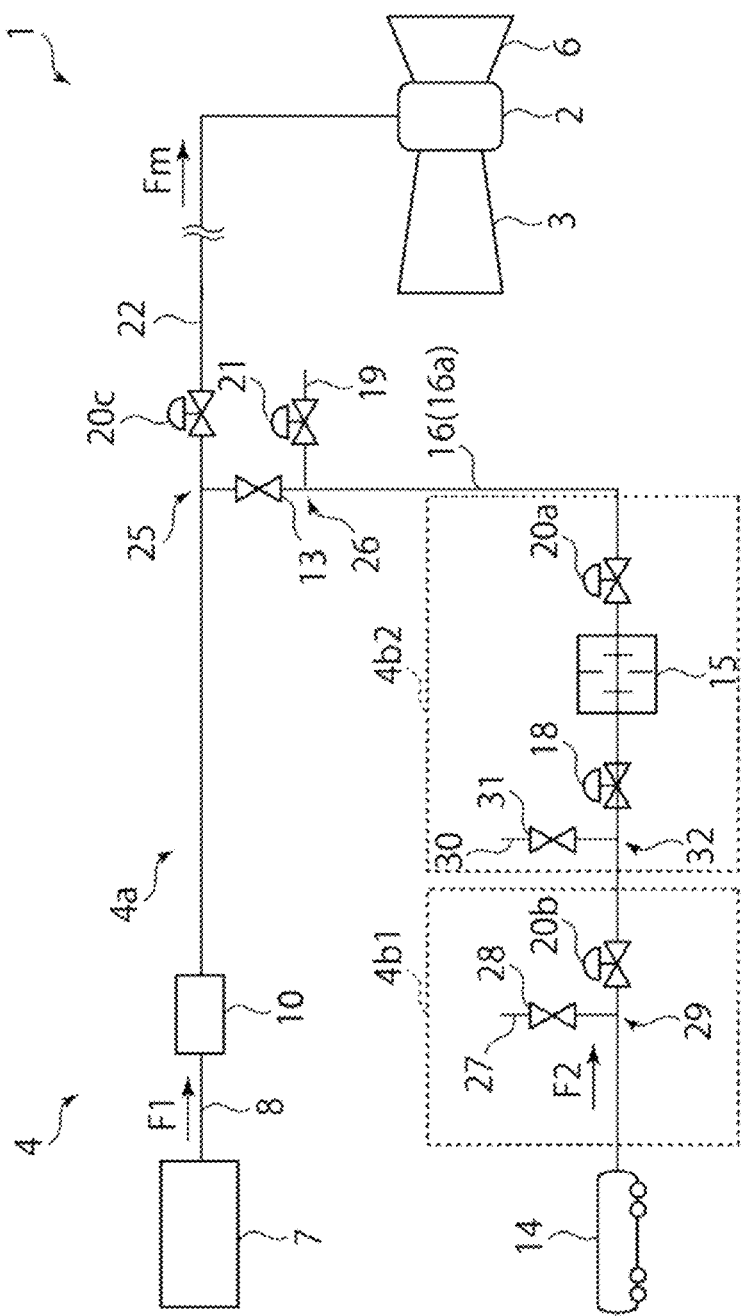
FIG. 8 is a schematic configuration diagram of a gas turbine according to a third embodiment.

FIG. 8 is a schematic configuration diagram of a gas turbine 1 according to a third embodiment. In the third embodiment, as compared with the first embodiment illustrated in FIG. 1, there is provided an existing portion 4a allowing for single fuel combustion operation with the first fuel F1 by having a configuration centering on the first fuel supply line 8, and a first additional facility 4b1 and a second additional facility 4b2 for supplying the existing portion 4a with the second fuel F2 are additionally provided in a post-fitting manner. This can easily improve, by additionally providing these additional facilities to the existing portion 4a in which the single fuel combustion operation can be performed with the first fuel F1, the configuration of the existing portion 4a to a configuration allowing for the mixed fuel combustion operation.

The first additional facility 4b1 includes the second shutoff valve 20b and the flow control valve 18. The second additional facility 4b2 includes the first shutoff valve 20a and the second flow meter 15. The first additional facility 4b1 and the second additional facility 4b2 are sequentially connected between a second fuel supply unit 14 and the merging portion 25. The second additional facility 4b2 and the merging portion 25 are connected to each other via an extension line 16a constituting the second fuel supply line 16. The extension line 16a is provided over several 10 m, for example, according to the position of the second fuel supply unit 14.

This configuration can be improved to allow for the mixed fuel combustion operation with the first fuel F1 and the second fuel F2 by attaching the first additional facility 4b1 and the second additional facility 4b2 to the existing portion 4a capable of single fuel combustion operation with the first fuel F1. In particular, the first additional facility 4b1 and the second additional facility 4b2 can each be produced at another place. Transporting the first additional facility 4b1 and the second additional facility 4b2 produced at another place to a site where the gas turbine 1 is installed and attaching these facilities to the existing portion 4a via the extension line 16a at the site allows for efficient additional installation work with a reduced amount of work at the site.

As described above, according to each of the above embodiments, in the series of control at the start of the mixed fuel combustion of the gas turbine 1, only the second fuel F2 passes through the second flow meter 15 disposed in the second fuel supply line 16. Therefore, the mixed fuel combustion rate as a parameter for monitoring the operating state of the gas turbine 1 is prevented from being erroneously recognized by using the detection value of the second flow meter 15 when the first fuel F1 having a different density passes through the second flow meter 15, allowing for stable operation of the gas turbine 1.

In addition, it is possible to replace the components in the above-described embodiments with well-known components as appropriate without departing from the essence of the present disclosure, and the above-described embodiments may be combined as appropriate.

The contents described in the above embodiments is understood as follows, for example.

(1) A fuel supply device for a gas turbine according to an aspect is a fuel supply device for a gas turbine, which can supply a first fuel and a second fuel having a higher combustion speed than the first fuel to a combustor of the gas turbine, the fuel supply device including:

a first fuel supply line for supplying the first fuel;

a second fuel supply line for supplying the second fuel;

a mixing line that connects a merging portion of the first fuel supply line and the second fuel supply line to the combustor;

a first shutoff valve provided in the second fuel supply line and serving as a controlled object when an operating state of the gas turbine is switched from a single fuel combustion state in which only the first fuel is supplied to the combustor to a mixed fuel combustion state in which a mixed fuel of the first fuel and the second fuel is supplied to the combustor; and a flow meter provided upstream of the first shutoff valve in the second fuel supply line and capable of outputting a detection value of a flow rate of the second fuel in order to calculate a mixing ratio of the first fuel and the second fuel for monitoring an operating state of the gas turbine.

According to the above aspect (1), the second fuel supply line is provided with the first shutoff valve serving as a controlled object when the operating state of the gas turbine is switched from the single fuel combustion state to the mixed fuel combustion state. A flow meter capable of outputting a detection value of the flow rate of the second fuel is provided in a portion of the second fuel supply line upstream of the first shutoff valve in order to calculate a mixing ratio which is one of monitoring parameters of the operating state of the gas turbine. In the fuel supply device for a gas turbine having this configuration, supplying the second fuel from the upstream side of the second fuel supply line with the first shutoff valve closed before the operating state of the gas turbine is switched from the single fuel combustion state to the mixed fuel combustion state allows the upstream side of the first shutoff valve in the second fuel supply line to be filled with the second fuel. Then, by opening the first shutoff valve when the first shutoff valve has the upstream pressure larger than the downstream pressure, the second fuel is supplied from the second fuel supply line to the merging portion, and mixed fuel combustion of the gas turbine can be started. In such a series of control at the start of the mixed fuel combustion of the gas turbine, only the second fuel passes through the flow meter disposed in the second fuel supply line. Therefore, the mixed fuel combustion rate as a parameter for monitoring the operating state of the gas turbine is prevented from being erroneously recognized by using the detection value of the flow meter due to the passage of the first fuel having a different density, allowing for stable operation of the gas turbine.

(2) Another aspect includes, in addition to the above aspect (1), an isolation valve provided between the first shutoff valve and the merging portion in the second fuel supply line.

According to the above aspect (2), the isolation valve is provided between the first shutoff valve and the merging portion. The isolation valve is closed before the operating state of the gas turbine is switched from the single fuel combustion state to the mixed fuel combustion state, thereby regulating a filling range of the first fuel in the second fuel supply line so that the first fuel entering the second fuel supply line from the merging portion does not reach the flow meter. This causes the first fuel not to pass through the flow meter disposed in the second fuel supply line at the start of the mixed fuel combustion of the gas turbine. The mixed fuel combustion rate as a parameter for monitoring the operating state of the gas turbine is prevented from being erroneously recognized by using the detection value of the flow meter due to the passage of the first fuel having a different density, allowing for stable operation of the gas turbine.

(3) In another aspect in addition to the above aspect (2), the isolation valve is provided at a position closer to the merging portion than to the first shutoff valve in the second fuel supply line.

According to the above aspect (3), the isolation valve is disposed in the vicinity of the merging portion in the second fuel supply line. As described above, the isolation valve has a function of regulating the filling range of the first fuel entering the second fuel supply line from the merging portion before the start of the mixed fuel combustion of the gas turbine. Therefore, disposing the isolation valve near the merging portion can reduce the filling range.

When the gas turbine is tripped (urgently stopped) for some reason during the mixed fuel combustion operation of the gas turbine, the shutoff valve disposed in the mixing line (the valve capable of shutting off the entire fuel supplied to the combustor on the downstream side of the merging portion) and the first shutoff valve disposed in the second fuel supply line are switched to the closed state to stop the fuel supply to the combustor. In this situation, if a valve which can be opened and closed is not disposed near the merging portion, the second fuel remaining in the second fuel supply line is directly supplied to the combustor when the single fuel combustion operation is performed with the first fuel at the time of next restart of the gas turbine. In the present aspect, disposing the isolation valve near the merging portion in the second fuel supply line can reduce the second fuel supplied to the combustor when the gas turbine is restarted.

(4) Another aspect further includes, in addition to the above aspect (2) or (3), a vent line branched from between the first shutoff valve and the isolation valve in the second fuel supply line and a vent valve provided in the vent line.

According to the above aspect (4), the second fuel supply line is provided with the vent line having the vent valve so as to be branched off. This allows, by supplying the second fuel while opening the vent valve with the isolation valve closed before the start of the mixed fuel combustion of the gas turbine, the second fuel to be filled in a range up to the isolation valve in the second fuel supply line.

(5) In another aspect in addition to the above aspect (4), a branch point of the vent line from the second fuel supply line is provided at a position closer to the merging portion than to the first shutoff valve.

According to the above aspect (5), the branch point of the vent line with respect to the second fuel supply line is provided near the merging portion. This can have a wide filling range when filling the second fuel supply line with the first fuel before the mixed fuel combustion of the gas turbine is started.

(6) Another aspect further includes, in addition to any one of the above aspects (1) to (5), a second shutoff valve provided upstream of the flow meter in the second fuel supply line.

According to the above aspect (6), the second shutoff valve is provided upstream of the flow meter in the second fuel supply line. This allows, when an abnormality occurs in the operation of the gas turbine, the supply of the second fuel having a high combustion speed to be accurately stopped by closing the second shutoff valve together with the first shutoff valve.

(7) Another aspect further includes, in addition to any one of the above aspects (1) to (6), a third shutoff valve provided in the mixing line.

According to the above aspect (7), the third shutoff valve is provided in the mixing line on the downstream side of the merging portion. This allows, when an abnormality occurs in the operation of the gas turbine, the supply of fuel to the combustor to be accurately stopped by closing the third shutoff valve.

(8) In another aspect in addition to the above aspect (1), the first shutoff valve is provided at a position closer to the merging portion than to the first flow meter in the second fuel supply line.

According to the above aspect (8), the position of the first shutoff valve provided in the second fuel supply line is set to be closer to the merging portion than to the flow meter. This allows the first shutoff valve to also have the above-mentioned function of the isolation valve, allowing the configuration of the fuel supply device to be simplified by omitting the isolation valve.

(9) In another aspect in addition to any one of the above aspects (1) to (8), the first shutoff valve and the flow meter are integrally configured as an additional unit.

According to the above aspect (9), the first shutoff valve and the flow meter, which are main components provided in the second fuel supply line, may be integrally configured as an additional unit. In this case, for example, the fuel supply device of the existing gas turbine allowing for only the single fuel combustion of the first fuel can be easily improved to the gas turbine allowing for the mixed fuel combustion by post-attaching the additional unit.

(10) In another aspect in addition to any one of the above aspects (1) to (9), the first fuel includes natural gas, and the second fuel includes hydrogen gas.

According to the above aspect (10), in the fuel supply device for supplying fuel to the gas turbine allowing for mixed fuel combustion of respective fuels including natural gas and hydrogen gas as the first fuel and the second fuel, the mixed fuel combustion rate as a parameter for monitoring the operating state of the gas turbine is prevented from being erroneously recognized, allowing for stable operation of the gas turbine.

(11) A method for controlling a fuel supply device for a gas turbine according to an aspect is a method for controlling a fuel supply device for a gas turbine, which can supply a first fuel and a second fuel having a higher combustion speed than the first fuel to a combustor of the gas turbine, the fuel supply device including:
a first fuel supply line for supplying the first fuel;
a second fuel supply line for supplying the second fuel;
a mixing line that connects a merging portion of the first fuel supply line and the second fuel supply line to the combustor;

a first shutoff valve provided in the second fuel supply line and serving as a controlled object when an operating state of the gas turbine is switched from a single fuel combustion state in which only the first fuel is supplied to the combustor to a mixed fuel combustion state in which a mixed fuel of the first fuel and the second fuel is supplied to the combustor;

a flow meter provided upstream of the first shutoff valve in the second fuel supply line and capable of outputting a detection value of a flow rate of the second fuel in order to calculate a mixing ratio of the first fuel and the second fuel for monitoring an operating state of the gas turbine;

an isolation valve provided between the first shutoff valve and the merging portion in the second fuel supply line;

a vent line branched from between the first shutoff valve and the isolation valve in the second fuel supply line; and a vent valve provided in the vent line, the method including:

supplying a second fuel to an upstream side of the isolation valve in the second fuel supply line with the gas turbine stopped and the isolation valve closed;

supplying the first fuel to a downstream side of the first shutoff valve in the second fuel supply line by closing the first shutoff valve and opening the isolation valve; and opening the first shutoff valve when the first shutoff valve has an upstream pressure higher than a downstream pressure in the second fuel supply line with the gas turbine started.

According to the above aspect (11), the second fuel supply line is provided with the first shutoff valve as a controlled object when the operating state of the gas turbine is switched from the single fuel combustion state to the mixed fuel combustion state. A flow meter capable of outputting a detection value of the flow rate of the second fuel is provided in a portion of the second fuel supply line upstream of the first shutoff valve in order to calculate a mixing ratio which is one of monitoring parameters of the operating state of the gas turbine. In the fuel supply device for a gas turbine having this configuration, supplying the second fuel from the upstream side of the second fuel supply line with the first shutoff valve closed before the operating state of the gas turbine is switched from the single fuel combustion state to the mixed fuel combustion state allows the upstream side of the first shutoff valve in the second fuel supply line to be filled with the second fuel. Opening the first shutoff valve when the first shutoff valve has the upstream pressure larger than the downstream pressure allows the second fuel to be supplied from the second fuel supply line to the merging portion and mixed fuel combustion of the gas turbine to be started. In such a series of control at the start of the mixed fuel combustion of the gas turbine, only the second fuel passes through the flow meter disposed in the second fuel supply line. Therefore, the mixed fuel combustion rate as a parameter for monitoring the operating state of the gas turbine is prevented from being erroneously recognized by using the detection value of the flow meter due to the passage of the first fuel having a different density, allowing for stable operation of the gas turbine.

(12) A method for controlling a fuel supply device for a gas turbine according to an aspect is a method for controlling a fuel supply device for a gas turbine, which can supply a first fuel and a second fuel having a higher combustion speed than the first fuel to a combustor of the gas turbine, the fuel supply device including:

a first fuel supply line for supplying the first fuel;

a second fuel supply line for supplying the second fuel;

a mixing line that connects a merging portion of the first fuel supply line and the second fuel supply line to the combustor;

a first shutoff valve provided in the second fuel supply line and serving as a controlled object when an operating state of the gas turbine is switched from a single fuel combustion state in which only the first fuel is supplied to the combustor to a mixed fuel combustion state in which a mixed fuel of the first fuel and the second fuel is supplied to the combustor;

a flow meter provided upstream of the first shutoff valve in the second fuel supply line and capable of outputting a detection value of a flow rate of the second fuel in order to calculate a mixing ratio of the first fuel and the second fuel for monitoring an operating state of the gas turbine;

a vent line branched from between the first shutoff valve and the flow meter in the second fuel supply line; and a vent valve provided in the vent line, the method including:

supplying a second fuel to an upstream side of the isolation valve in the second fuel supply line with the gas turbine stopped and the first shutoff valve closed;

supplying the first fuel to a downstream side of the first shutoff valve in the second fuel supply line; and opening the first shutoff valve when the first shutoff valve has an upstream pressure higher than a downstream pressure in the second fuel supply line with the gas turbine started.

According to the above aspect (12), the second fuel supply line is provided with the first shutoff valve as a controlled object when the operating state of the gas turbine is switched from the single fuel combustion state to the mixed fuel combustion state. A flow meter capable of outputting a detection value of the flow rate of the second fuel is provided in a portion of the second fuel supply line upstream of the first shutoff valve in order to calculate a mixing ratio which is one of monitoring parameters of the operating state of the gas turbine. In the fuel supply device for a gas turbine having this configuration, supplying the second fuel is supplied from the upstream side of the second fuel supply line with the first shutoff valve closed before the operating state of the gas turbine is switched from the single fuel combustion state to the mixed fuel combustion state allows the upstream side of the first shutoff valve in the second fuel supply line can be filled with the second fuel. Opening the first shutoff valve when the first shutoff valve has the upstream pressure larger than the downstream pressure allows the second fuel to be supplied from the second fuel supply line to the merging portion and mixed fuel combustion of the gas turbine to be started. In such a series of control at the start of the mixed fuel combustion of the gas turbine, only the second fuel passes through the flow meter disposed in the second fuel supply line. Therefore, the mixed fuel combustion rate as a parameter for monitoring the operating state of the gas turbine is prevented from being erroneously recognized by using the detection value of the flow meter due to the passage of the first fuel having a different density, allowing for stable operation of the gas turbine.

While preferred embodiments of the invention have been described as above, it is to be understood that variations and modifications will be apparent to those skilled in the art without departing from the scope and spirit of the invention.

The scope of the invention, therefore, is to be determined solely by the following claims.

The invention claimed is:

1. A fuel supply device for a gas turbine, which can supply a first fuel and a second fuel having a higher combustion speed than the first fuel to a combustor of the gas turbine, the fuel supply device comprising:
a first fuel supply line for supplying the first fuel;
a second fuel supply line for supplying the second fuel, wherein the first fuel supply line and the second fuel supply line merge together at a junction point;
a mixing line that connects the junction point of the first fuel supply line and the second fuel supply line to the combustor;
a first shutoff valve provided in the second fuel supply line and serving as a controlled object when an operating state of the gas turbine is switched from a single fuel combustion state in which only the first fuel is supplied to the combustor to a mixed fuel combustion state in which a mixed fuel of the first fuel and the second fuel is supplied to the combustor;
a flow meter provided upstream of the first shutoff valve in the second fuel supply line and capable of outputting a detection value of a flow rate of the second fuel in order to calculate a mixing ratio of the first fuel and the second fuel for monitoring an operating state of the gas turbine; and
an isolation valve provided between the first shutoff valve and the junction point in the second fuel supply line,
wherein the isolation valve is provided at a position closer to the junction point than to the first shutoff valve in the second fuel supply line, and
wherein with respect to an upstream direction from the isolation valve, the first shutoff valve is the most adjacent valve to the isolation valve in the second fuel supply line.

2. The fuel supply device for a gas turbine according to claim 1, further comprising:
a vent line branched from between the first shutoff valve and the isolation valve in the second fuel supply line; and
a vent valve provided in the vent line.

3. The fuel supply device for a gas turbine according to claim 2, wherein a branch point of the vent line from the second fuel supply line is provided at a position closer to the junction point than to the first shutoff valve.

4. The fuel supply device for a gas turbine according to claim 1, further comprising a second shutoff valve provided upstream of the flow meter in the second fuel supply line.

5. The fuel supply device for a gas turbine according to claim 1, further comprising a third shutoff valve provided in the mixing line.

6. The fuel supply device for a gas turbine according to claim 1, wherein the first shutoff valve is provided at a position closer to the junction point than to the flow meter in the second fuel supply line.

7. The fuel supply device for a gas turbine according to claim 1, wherein the first shutoff valve and the flow meter are integrally configured as an additional unit.

8. The fuel supply device for a gas turbine according to claim 1, wherein
the first fuel includes natural gas, and
the second fuel includes hydrogen gas.

9. A method for controlling a fuel supply device for a gas turbine, which can supply a first fuel and a second fuel having a higher combustion speed than the first fuel to a combustor of the gas turbine,
the fuel supply device comprising:
a first fuel supply line for supplying the first fuel;
a second fuel supply line for supplying the second fuel, wherein the first fuel supply line and the second fuel supply line merge together at a junction point;
a mixing line that connects the junction point of the first fuel supply line and the second fuel supply line to the combustor;
a first shutoff valve provided in the second fuel supply line and serving as a controlled object when an operating state of the gas turbine is switched from a single fuel combustion state in which only the first fuel is supplied to the combustor to a mixed fuel combustion state in which a mixed fuel of the first fuel and the second fuel is supplied to the combustor;
a flow meter provided upstream of the first shutoff valve in the second fuel supply line and capable of outputting a detection value of a flow rate of the second fuel in order to calculate a mixing ratio of the first fuel and the second fuel for monitoring an operating state of the gas turbine;
an isolation valve provided between the first shutoff valve and the junction point in the second fuel supply line, wherein the isolation valve is provided at a position closer to the junction point than to the first shutoff valve in the second fuel supply line, and wherein with respect to an upstream direction from the isolation valve, the first shutoff valve is the most adjacent valve to the isolation valve in the second fuel supply line;
a vent line branched from between the first shutoff valve and the isolation valve in the second fuel supply line; and
a vent valve provided in the vent line,
the method comprising:
supplying a second fuel to an upstream side of the isolation valve in the second fuel supply line with the gas turbine stopped and the isolation valve closed;
supplying the first fuel to a downstream side of the first shutoff valve in the second fuel supply line by closing the first shutoff valve and opening the isolation valve; and
opening the first shutoff valve when the first shutoff valve has an upstream pressure higher than a downstream pressure in the second fuel supply line with the gas turbine started.

10. A method for controlling a fuel supply device for a gas turbine, which can supply a first fuel and a second fuel having a higher combustion speed than the first fuel to a combustor of the gas turbine,
the fuel supply device comprising:
a first fuel supply line for supplying the first fuel;
a second fuel supply line for supplying the second fuel, wherein the first fuel supply line and the second fuel supply line merge together at a junction point;
a mixing line that connects the junction point of the first fuel supply line and the second fuel supply line to the combustor;
a first shutoff valve provided in the second fuel supply line and serving as a controlled object when an operating state of the gas turbine is switched from a single fuel combustion state in which only the first fuel is supplied to the combustor to a mixed fuel combustion state in which a mixed fuel of the first fuel and the second fuel is supplied to the combustor;
a flow meter provided upstream of the first shutoff valve in the second fuel supply line and capable of outputting a detection value of a flow rate of the second fuel in order to calculate a mixing ratio of the first fuel and the second fuel for monitoring an operating state of the gas turbine;

an isolation valve provided between the first shutoff valve and the junction point in the second fuel supply line, wherein the isolation valve is provided at a position closer to the junction point than to the first shutoff valve in the second fuel supply line, and wherein with respect to an upstream direction from the isolation valve, the first shutoff valve is the most adjacent valve to the isolation valve in the second fuel supply line;

a vent line branched from between the first shutoff valve and the flow meter in the second fuel supply line; and a vent valve provided in the vent line, the method comprising:

supplying the second fuel to an upstream side of the isolation valve in the second fuel supply line with the gas turbine stopped and the first shutoff valve closed;

supplying the first fuel to a downstream side of the first shutoff valve in the second fuel supply line; and opening the first shutoff valve when the first shutoff valve has an upstream pressure higher than a downstream pressure in the second fuel supply line with the gas turbine started.

* * * * *